United States Patent
Kinpara et al.

(10) Patent No.: US 7,852,039 B2
(45) Date of Patent: Dec. 14, 2010

(54) CONTROL APPARATUS FOR AC ROTARY MACHINE

(75) Inventors: Yoshihiko Kinpara, Tokyo (JP); Kouki Naka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 855 days.

(21) Appl. No.: 11/760,834

(22) Filed: Jun. 11, 2007

(65) Prior Publication Data
US 2008/0007198 A1    Jan. 10, 2008

(30) Foreign Application Priority Data
Jun. 21, 2006    (JP)    ............... 2006-171417

(51) Int. Cl.
*H02P 1/16*    (2006.01)
(52) U.S. Cl. .................. 318/778; 318/807; 318/720
(58) Field of Classification Search .......... 318/700, 318/799, 778, 807, 720, 400.07, 704, 400.01
See application file for complete search history.

(56) References Cited

U.S. PATENT DOCUMENTS 5,854,547 A    12/1998    Nakazawa
6,315,081 B1 *    11/2001    Yeo ........................... 187/290
6,462,430 B1    10/2002    Joong et al.
6,825,637 B2    11/2004    Kinpara et al.
7,034,427 B2    4/2006    Hirzel

FOREIGN PATENT DOCUMENTS

DE    196 36 784 A1    3/1997
JP    2003-9486    1/2003
JP    2005-160278    6/2005

* cited by examiner

*Primary Examiner*—Karen Masih
(74) *Attorney, Agent, or Firm*—Leydig, Voit & Mayer, Ltd.

(57) ABSTRACT

A control apparatus is for controlling an AC rotary machine which includes a first and second stator elements and a rotor, in which the first stator element can be turned, or offset, in a circumferential direction relative to the second stator element. The control apparatus includes an actuator for adjusting a voltage induced in a stator coil due to rotation of the rotor by driving the first stator element, a magnetic flux command calculator for calculating a desired magnetic flux amplitude command based on rotating speed of the AC rotary machine, a magnetic flux estimator for estimating magnetic flux amplitude of the AC rotary machine, a speed command calculator for calculating an actuator speed command to be given to the actuator so that the estimated magnetic flux amplitude follows the magnetic flux amplitude command, and an actuator controller for controlling the actuator according to the actuator speed command.

12 Claims, 19 Drawing Sheets

CONTROL APPARATUS FOR AC ROTARY MACHINE

BACKGROUND OF THE INVENTION

1. Field of the Invention

The present invention relates to a control apparatus for controlling an AC rotary machine wherein the control apparatus can regulate the amount of induced voltage by means of an actuator.

2. Description of the Background Art

The amount of induced voltage produced in an AC rotary machine is proportional to the product of the magnitude of magnetic flux and rotating speed. In a case where a power converter is used to drive an AC rotary machine with variable rotating speed, there can arise such a situation that induced voltage produced in a high-speed range of the machine becomes so high as to exceed a maximum level of voltage which the power converter can output. In such kinds of AC rotary machine as an induction machine or a synchronous reluctance machine which does not use any permanent magnets, the magnitude of magnetic flux is proportional to a magnetic flux component of an armature current and, thus, it is possible to maintain the induced voltage within an output voltage range of a power converter by reducing the magnetic flux component of the armature current even when the AC rotary machine is driven in the high-speed range.

In an AC rotary machine using permanent magnets on the other hand, an induced voltage is produced due to the permanent magnets. Therefore, when the machine is operated in a high-speed range, it is necessary that an armature current contain a magnetic flux component for canceling magnetic flux produced by the permanent magnets, resulting in an increase in the armature current. This means that, when an AC rotary machine using permanent magnets is operated in a high-speed range, there arises a problem that the machine requires a power converter having a large current capacity or a problem related to loss or heat generation caused by an increase in the current.

Japanese Unexamined Patent Publication No. 2005-160278 proposes a synchronous motor implementing an arrangement intended for solving the aforementioned problems of the prior art. According to the Publication, the synchronous motor includes a stator having a plurality of magnetic teeth on which coils are wound and a rotor having permanent magnets, wherein electric power is supplied into the coils from the exterior to produce magnetic fields from the magnetic teeth so that the rotor generates a torque. The stator is dividend into at least two separate portions, at least one of the separate portions constituting a movable stator element which serves to vary phase of the magnetic teeth relative to the other portion of the stator. The synchronous motor is provided with a movable stator element control device for controlling phase of the movable stator element according to state of the movable stator element according to operating conditions of the synchronous motor.

This arrangement of the Publication makes it possible to reduce a counter electromotive force which occurs in the synchronous motor by varying the phase of the movable stator element so that the motor torque becomes zero when a zero torque command is given. Also, as the above arrangement eliminates the need for field-weakening current, it becomes possible to greatly reduce losses caused by drag rotation of the rotor. In addition, when rotating speed of the motor is equal to or above a threshold value, the phase of the movable stator element may be varied so that the counter electromotive force will not be produced. This arrangement of the Publication can increase the rotating speed of the motor without increasing an output voltage of an inverter or a battery.

A conventional control apparatus for controlling an AC rotary machine controls a phase difference between a stator and a movable stator element by means of an actuator as discussed above, the phase difference between the stator and the movable stator element being a control parameter of the actuator. Therefore, a control mechanism of the control apparatus requires means for detecting the phase difference between the stator and the movable stator element, the means being controlled by the actuator. The means required for this purpose is a position sensor which is generally complex and expensive. For this reason, there has been a problem that it has been impossible to employ such a low-cost actuator that can not detect the position of the movable stator element but can control only a time derivative value of the actuator phase difference.

SUMMARY OF THE INVENTION

The present invention is intended to provide a solution to the aforementioned problems of the prior art. Accordingly, it is an object of the invention to provide such a control apparatus for an AC rotary machine that can control an actuator with a simple and inexpensive mechanism without the need for any position sensing means.

A control apparatus of the present invention is for controlling an AC rotary machine which includes a stator and a rotor, the stator having a coil wound thereon, in which at least one of the stator and the rotor is divided into at least two separate elements which are so configured that a phase difference representative of a relative position difference between one separate element and another can be varied in a circumferential direction. The control apparatus includes an actuator for adjusting a voltage induced in the coil of the stator due to rotation of the rotor by driving at least one of the separate elements, a magnetic flux command calculator for calculating a desired magnetic flux amplitude command based on rotating speed of the AC rotary machine, a magnetic flux estimator for calculating estimated magnetic flux amplitude of the AC rotary machine, a speed command calculator for calculating an actuator speed command to be given to the actuator so that the estimated magnetic flux amplitude follows the magnetic flux amplitude command, and an actuator controller for controlling the actuator according to the actuator speed command.

Since the control apparatus for the AC rotary machine of the invention includes the actuator controller which controls the actuator according to the actuator speed command, and not a position command, as mentioned above, the control apparatus does not require generally complex and expensive means for detecting the phase difference. Accordingly, it is possible to employ, for example, an inexpensive driving device which is not designed to detect a phase difference but can control only a time derivative value of the actuator phase difference as the actuator.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

The present invention is now described in detail with reference to the accompanying drawings.

First Embodiment

Figure 1:
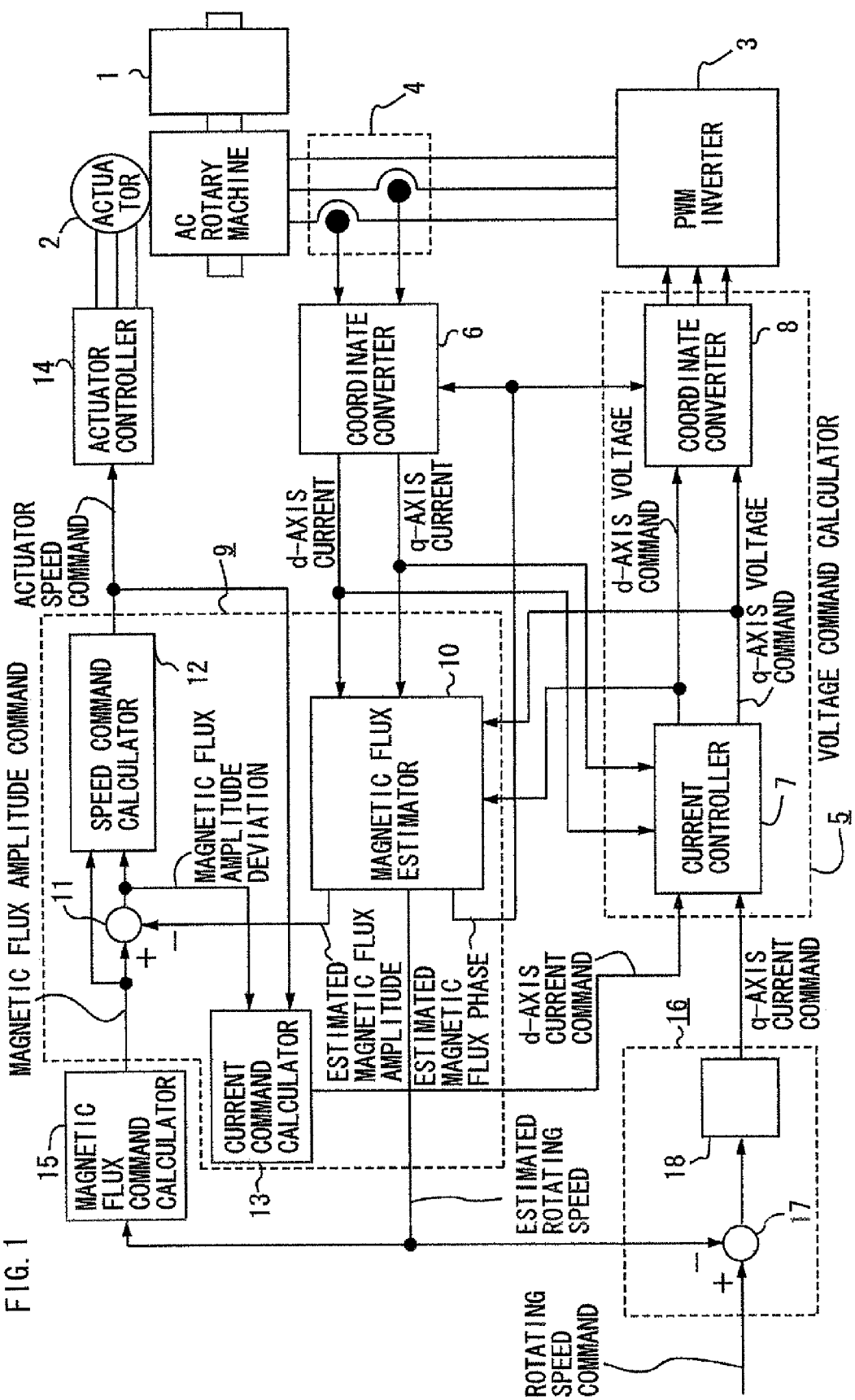
FIG. 1 is a block diagram of a control apparatus for controlling an AC rotary machine according to a first embodiment of the invention.

FIG. 1 is a block diagram of a control apparatus for controlling an AC rotary machine 1 according to a first embodiment of the invention, in which an actuator 2 connected to the AC rotary machine 1 controls the amount of induced voltage occurring due to the presence of a permanent magnet. As shown in FIG. 1, the control apparatus of the AC rotary machine 1 includes, in addition to the actuator 2, a pulse-width-modulation (PWM) inverter 3, a current sensor 4, a voltage command calculator 5, a coordinate converter 6, an actuator speed command calculator 9, an actuator controller 14, a magnetic flux command calculator 15 and a speed controller 16. The following discussion contains a general description of individual constituent elements of the control apparatus followed by a detailed description of the working of principal elements.

The PWM inverter 3, which is referred to also as a voltage applicator 3, generates 3-phase voltages and applies the same to the AC rotary machine 1. A current sensor 4 detects currents flowing into the AC rotary machine 1. While the current sensor 4 detects the currents flowing in two of three phases in the first embodiment, the below-described configuration of the embodiment may be modified such that the current sensor 4 detects values representative of 3-phase currents flowing into the AC rotary machine 1 based on DC currents flowing in the PWM inverter 3 and information on pulse width modulation by using a conventionally known method.

The voltage command calculator 5 produces 3-phase voltage commands according to the currents detected by the current sensor 4 and outputs the same to the PWM inverter 3, the voltage commands indicating the voltages to be applied by the PWM inverter 3. The coordinate converter 6 converts the detected currents output from the current sensor 4 into a d-axis current and a q-axis current expressed in a dual-axis (dq-axis) rotating coordinate system based on an estimated magnetic flux phase. A description will be given later as to how the estimated magnetic flux phase which is translated into phases on d- and q-axes of the dual-axis rotating coordinate system is calculated.

The voltage command calculator 5 includes a current controller 7 and an internal coordinate converter 8. The current controller 7 calculates and outputs a d-axis voltage command and a q-axis voltage command expressed in the dual-axis (dq-axis) rotating coordinate system such that the d- and q-axis currents determined based on the detected currents output from the current sensor 4 coincide respectively with a d-axis current command and a q-axis current command expressed in the dual-axis (dq-axis) rotating coordinate system which rotates in synchronism with an electrically rotating angular frequency of the AC rotary machine 1.

The coordinate converter 8 generates and outputs the 3-phase voltage commands indicating the voltages to be applied by the PWM inverter 3 based on the d- and q-axis voltage commands expressed in the dual-axis (dq-axis) rotating coordinate system output from the current controller 7 as well as on the estimated magnetic flux phase.

The actuator speed command calculator 9 includes a magnetic flux estimator 10, a subtracter 11, a speed command calculator 12 and a current command calculator 13.

The magnetic flux estimator 10 generates and outputs estimated magnetic flux amplitude and estimated rotating speed of the AC rotary machine 1 in addition to the aforementioned estimated magnetic flux phase thereof based on the d- and q-axis voltage commands and the d- and q-axis currents expressed in the dual-axis (dq-axis) rotating coordinate system, wherein the estimated magnetic flux phase is a phase used by both the coordinate converter 6 and the coordinate converter 8 for coordinate conversion.

Since the magnetic flux estimator 10 has a conventional configuration as disclosed in PCT International Application Republication No. WO/2002/091558, for example, the magnetic flux estimator 10 is not described in detail herein.

The subtracter 11 generates a magnetic flux amplitude deviation by subtracting the estimated magnetic flux amplitude obtained from the magnetic flux estimator 10 from a magnetic flux amplitude command given to the AC rotary machine 1 and, then, the subtracter 11 outputs the magnetic flux amplitude deviation thus calculated.

The speed command calculator 12 generates an actuator speed command which defines a speed at which the actuator 2 should run based on the magnetic flux amplitude command and the magnetic flux amplitude deviation.

The current command calculator 13 generates and outputs the d-axis current command expressed in the dual-axis (dq-axis) rotating coordinate system by amplifying the magnetic flux amplitude deviation when the absolute value of the actuator speed command exceeds a specific value.

The actuator controller 14 controls the operating speed of the actuator 2 which controllably varies the amount of induced voltage produced due to the permanent magnet in such a manner that the operating speed of the actuator 2 matches the actuator speed command.

The magnetic flux command calculator 15 generates and outputs the aforementioned magnetic flux amplitude command which defines the amplitude of rotor magnetic flux to be produced by the AC rotary machine 1 according to the estimated rotating speed obtained from the actuator speed command calculator 9.

In this embodiment, the magnetic flux command calculator 15 outputs the magnetic flux amplitude command as stated above. Since the amount of induced voltage produced in the AC rotary machine 1 due to the permanent magnet is proportional to the product of the amplitude of magnetic flux and rotating speed of the AC rotary machine 1, however, it is possible to obtain the same advantageous effect as the first embodiment even when the configuration of the embodiment is so modified as to give an induced voltage amplitude command and estimated induced voltage amplitude instead of the magnetic flux amplitude command and the estimated magnetic flux amplitude to the subtracter 11, respectively. In this connection, it will be apparent to those skilled in the art that either the magnetic flux amplitude or the voltage amplitude can be used as a control parameter in determining the actuator speed command. Accordingly, it is to be understood with respect to the foregoing and following discussion of the present Specification that the magnetic flux amplitude and the voltage amplitude are equivalent to each other as an actuator speed control parameter and, thus, interchangeably usable.

The speed controller 16 includes a subtracter 17 and a speed control device 18. The subtracter 17 generates a rotating speed deviation by subtracting the estimated rotating speed obtained from the actuator speed command calculator 9 from an input rotating speed command and outputs the rotating speed deviation thus calculated. Then, the speed control device 18 generates the aforementioned q-axis current command expressed in the dual-axis (dq-axis) rotating coordinate system by amplifying the rotating speed deviation and outputs the q-axis current command thus generated.

Figure 2:
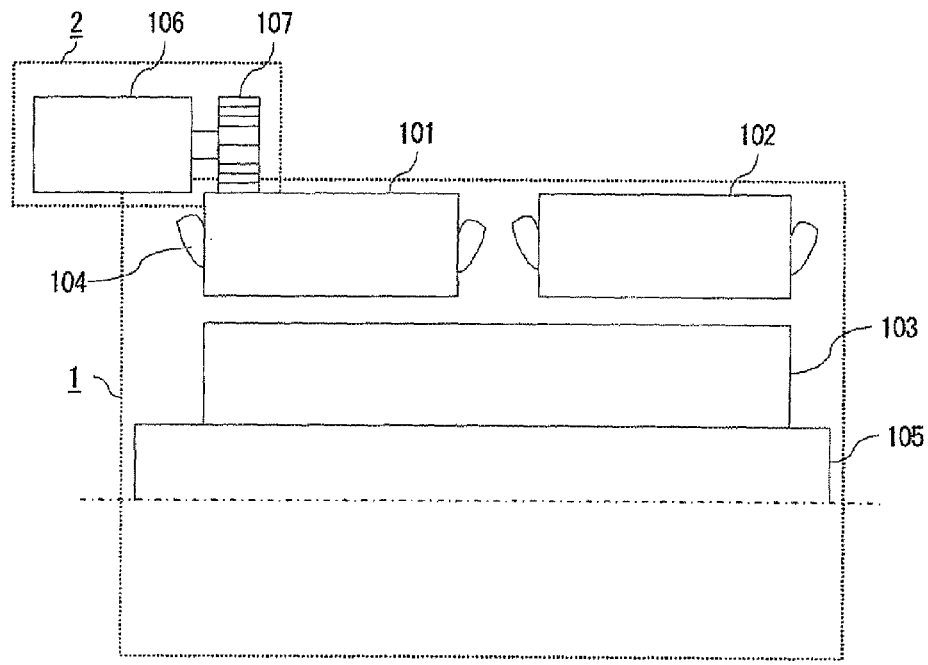
FIG. 2 is a diagram showing how the AC rotary machine and an actuator of the control apparatus of the first embodiment are configured.

Now, the AC rotary machine 1 and the actuator 2 are described with reference to FIG. 2 which is a diagram showing how the AC rotary machine 1 and the actuator 2 are configured. As shown in FIG. 2, the AC rotary machine 1 includes a first stator element 101 and a second stator element 102 which are separated along an axial direction of the AC rotary machine 1 as well as a rotor 103 which is fixedly mounted on a shaft 105, the rotor 103 being disposed to face both the first and second stator elements 101, 102. The first and second stator elements 101, 102 are provided with coils which are wound such that coil ends 104 protrude from axial ends of the respective stator elements 101, 102 as illustrated. The actuator 2 includes an auxiliary rotary machine 106 and a gear 107 which together serve to rotate the first stator element 101 in a circumferential direction thereof. While the gear 107 has an axis which is parallel to an axis of the first stator element 101 as depicted in FIG. 2 in the present embodiment, the gear 107 may be configured to have an axis intersecting or skewed with respect to the axis of the first stator element 101. The AC rotary machine 1 is provided with a stopper (not shown) for restricting movement (or rotation) of the first stator element 101 in the circumferential direction thereof within a range of 0 degrees to 180 degrees in terms of electrical angle of the AC rotary machine 1.

The auxiliary rotary machine 106 of the actuator 2 may be either an AC rotary machine, such as a synchronous machine or an induction machine, or a DC rotary machine. To add, the auxiliary rotary machine 106 is not necessarily limited to a rotary machine. For example, the auxiliary rotary machine 106 may be such a machine that produces a linear motion, such as a linear synchronous machine or a linear induction machine.

Figure 3A:
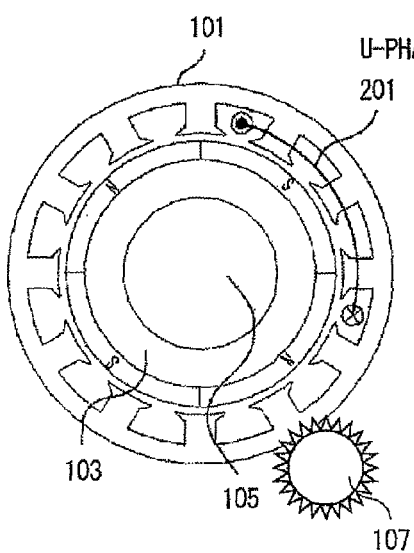
FIGS. 3A and 3B are side views of first and second stator elements of the control apparatus of the first embodiment, respectively.
Figure 3B:
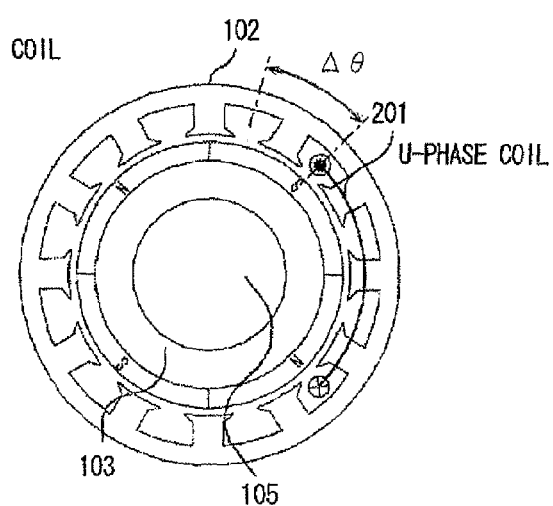

FIGS. 3A and 3B are side views of the first and second stator elements 101, 102, respectively. The actuator 2 provided in the control apparatus of the present embodiment serves to offset the first stator element 101 in the circumferential direction thereof to create a phase difference $\Delta\theta$ between U-phase coils 201 of the first stator element 101 and the second stator element 102, for example, as shown in FIGS. 3A and 3B. The coils 201 of the two stator elements 101, 102 may be connected either in series or parallel to each other.

Figure 4:
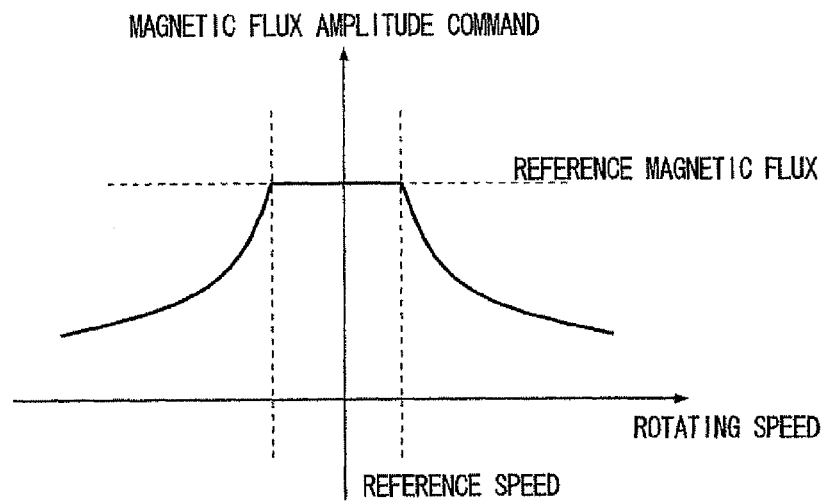
FIG. 4 is a diagram showing a relationship between rotating speed of the AC rotary machine and a magnetic flux amplitude command.

FIG. 4 is a diagram showing an example of a relationship between the rotating speed of the AC rotary machine 1 which is an input of the magnetic flux command calculator 15 and the magnetic flux amplitude command which is an output of the same. The relationship shown in FIG. 4 can be expressed mathematically as follows:

(Magnetic flux amplitude command)=(reference magnetic flux) in a range where |rotating speed|< (reference speed); and (Magnetic flux amplitude command)=(reference magnetic flux)×(reference speed)/|rotating speed| in a range where |rotating speed|>(reference speed).

It is understood from above that, if the magnetic flux amplitude is controlled to satisfy the above conditions defined in relation to the rotating speed of the AC rotary machine 1, it is possible to prevent overvoltage in a high-speed range of the AC rotary machine 1.

The actuator 2 for driving the first stator element 101 controls the aforementioned phase difference (phase angle) $\Delta\theta$ such that the magnetic flux amplitude of the AC rotary machine 1 follows the magnetic flux amplitude command shown in FIG. 4. While the actuator 2 is conventionally controlled based on a position (phase difference) command, the actuator 2 of the present invention is controlled based on a speed command.

Generally, a position sensor is simpler and less expensive than a rotating speed sensor for reasons briefly explained below. While an absolute encoder, an ABZ-phase encoder, a resolver and a Hall-effect device are examples of position sensors, an AB-phase encoder and a tachometer generator are examples of rotating speed sensors. To cite but one example, the ABZ-phase encoder which is an example of a position sensor requires an interface circuit since the ABZ-phase encoder has Z-phase for detecting a zero point, whereas the AB-phase encoder which is an example of a rotating speed sensor requires no interface circuit because the Z-phase is unnecessary in the AB-phase encoder. Thus, the rotating speed sensor requiring no interface circuit is generally simpler and less expensive compared to the position sensor.

Figure 5:
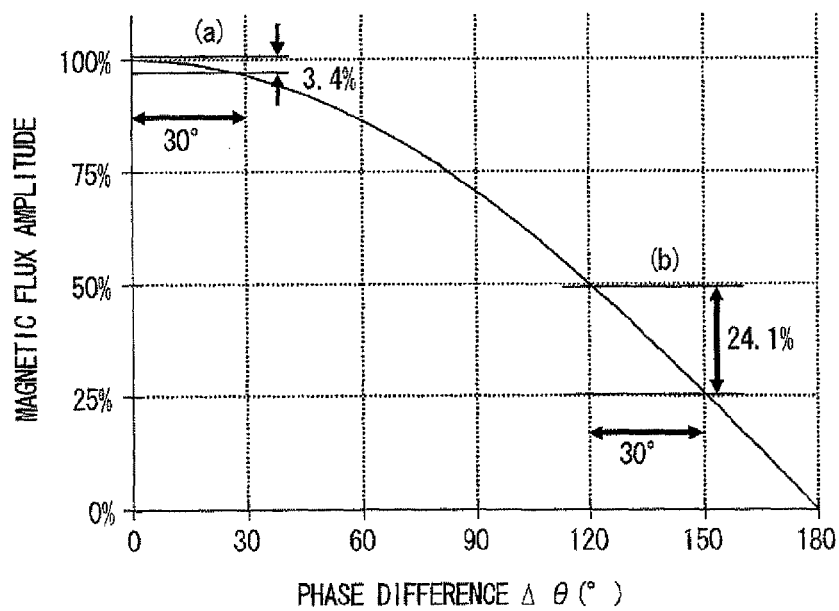
FIG. 5 is a diagram in which phase difference Δθ between a first stator element and a second stator element is plotted in relation to the amplitude of magnetic flux produced by a rotor of the AC rotary machine according to the first embodiment.

Firstly, a relationship between the magnetic flux and phase angle is explained with reference to FIG. 5 which is a diagram in which the phase difference $\Delta\theta$ between the first stator element 101 and the second stator element 102 is plotted in relation to the amplitude of the magnetic flux produced by the rotor 103 of the AC rotary machine 1. In FIG. 5, the phase difference $\Delta\theta$ represented by a horizontal axis indicates an angle of rotation (circumferential movement) of the first stator element 101 caused by the gear 107 of the actuator 2 in terms of electrical angle of the AC rotary machine 1. As can be seen from FIG. 5, the relationship between the magnetic flux and the phase difference $\Delta\theta$ can be expressed mathematically as follows:

$$\text{(Magnetic flux amplitude)} \propto \cos(\Delta\theta/2) \quad (1)$$

Also, there is a relationship expressed by equation (2) below between the operating speed of the actuator 2 (actuator speed) and the phase difference $\Delta\theta$:

$$\text{Phase difference } \Delta\theta = \int (\text{actuator speed}) \, dt \quad (2)$$

Now, the working of the actuator speed command calculator 9 is explained by using the relationships expressed by the aforementioned mathematical expression (1) and equation (2). Mathematical expression (1) above indicates that the phase difference $\Delta\theta$ increases when the operating speed of the actuator 2 is made positive and the phase difference $\Delta\theta$ decreases when the operating speed of the actuator 2 is made negative. On the other hand, it is recognized from FIG. 5 that the magnetic flux amplitude decreases when the phase difference $\Delta\theta$ increases and the magnetic flux amplitude is increased when the phase difference $\Delta\theta$ is decreased.

Accordingly, it is preferable to make the operating speed of the actuator 2 negative if the magnetic flux amplitude deviation output from the subtracter 11 that is obtained by subtracting the estimated magnetic flux amplitude output from the magnetic flux estimator 10 from the magnetic flux amplitude command given to the AC rotary machine 1 is positive and to make the operating speed of the actuator 2 positive if the magnetic flux amplitude deviation output from the subtracter 11 that is obtained by subtracting the estimated magnetic flux amplitude output from the magnetic flux estimator 10 from the magnetic flux amplitude command given to the AC rotary machine 1 is negative.

Thus, the speed command calculator 12 which outputs the actuator speed command based on the input magnetic flux amplitude deviation should preferably be a proportioning controller whose output value has an absolute value proportional to the absolute value of an input value, the output value of the proportioning controller having a reversed sigh with respect to the sign of the input value.

Depending on characteristics of a control mechanism including the actuator 2, however, the speed command calculator 12 may be configured with a proportional integral controller which handles not only a proportional component but also an integral factor.

In regions (a) and (b) shown in FIG. 5, the actuator speed command calculator 9 operates in the following fashion. Although the magnetic flux amplitude varies by only 3.4% when the actuator 2 varies the phase difference $\Delta\theta$ by 30 degrees in region (a) in which the magnetic flux amplitude remains at nearly 100% of a maximum amplitude, the magnetic flux amplitude varies by as much as 24.1% when the actuator 2 varies the phase difference $\Delta\theta$ by 30 degrees in region (b) in which the magnetic flux amplitude is 50% or less of the maximum amplitude. This means that the actuator 2 must turn, or offset, the first stator element 101 at high speed in the circumferential direction when the magnetic flux amplitude is to be controlled in a region in which the magnetic flux amplitude is nearly 100% of the maximum amplitude, whereas it is possible to control the magnetic flux amplitude with the same response even if the actuator 2 offsets the first stator element 101 at low speed in the circumferential direction when the magnetic flux amplitude is in a region in which the magnetic flux amplitude is 50% or less of the maximum amplitude.

Figure 6:
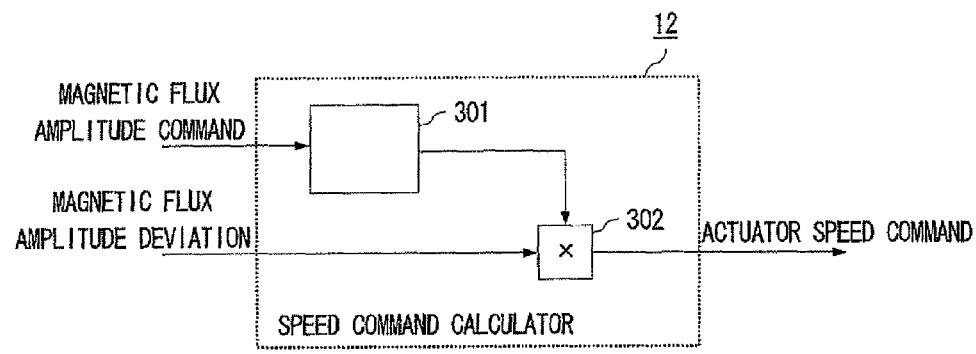
FIG. 6 is a diagram showing an internal configuration of a speed command calculator of the control apparatus of the first embodiment.

The speed command calculator 12 is now described in detail based on the above discussion. FIG. 6 is a diagram showing an internal configuration of the speed command calculator 12. The speed command calculator 12 includes a gain table 301 for outputting a gain which is varied according to the magnetic flux amplitude command and a multiplier 302 for multiplying the magnetic flux amplitude deviation by the gain output from the gain table 301 and outputting the result of this multiplication as the aforementioned actuator speed command.

A good approach to maintaining the same level of response in controlling the magnetic flux amplitude regardless of the value of the magnetic flux amplitude is to make the gain used in calculating the operating speed of the actuator 2 variable with the amount of the magnetic flux amplitude command as discussed above.

Taking into consideration the relationships expressed by the aforementioned mathematical expression (1) and equation (2), it is desirable that the gain output from the gain table 301 be determined according to mathematical expression (3) below:

$$\text{Gain} \propto \frac{1}{\sqrt{1 - \frac{\text{flux amplitude command}}{(\text{max. value of flux amplitude})^2}}} \quad (3)$$

Although the right side of mathematical expression (3) above becomes zero and the left side becomes $-\infty$ when the magnetic flux amplitude command indicates a maximum value of the magnetic flux amplitude, this problem can be avoided if the range of output of the right side of mathematical expression (3) is properly limited.

Figure 7:
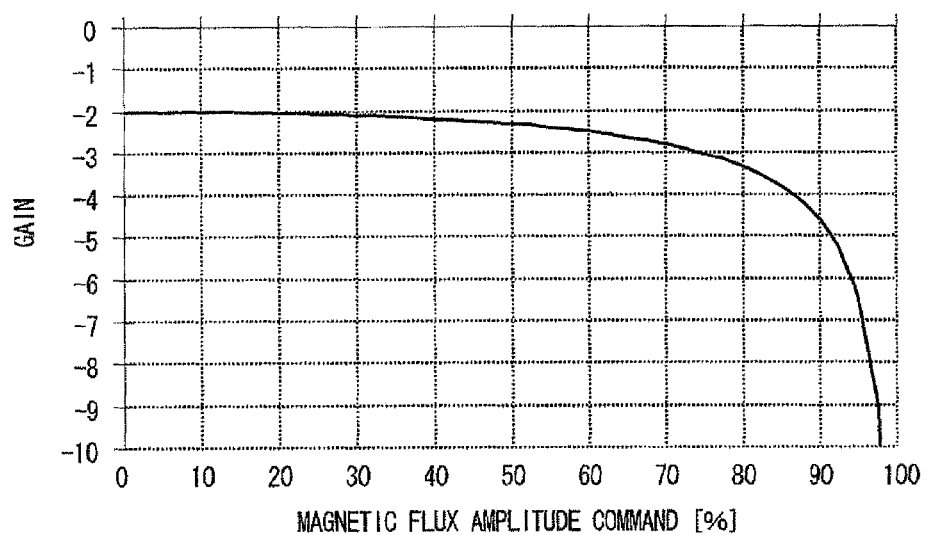
FIG. 7 is a diagram showing a plotting of gain values that a gain table provided in the speed command calculator of FIG. 6 outputs according to the magnetic flux amplitude command.

FIG. 7 is a diagram showing a plotting of values of the gain that the gain table 301 outputs according to the magnetic flux amplitude command taking into consideration the aforementioned problem. While the gain value comes closer to $-\infty$ as the magnetic flux amplitude command approaches 100% of the maximum amplitude value, it is possible to use the above-described arrangement of the embodiment if a definite lower limit (e.g., $-10$) is set on the value of gain.

The aforementioned arrangement of the first embodiment makes it possible to maintain the same level of response in controlling the magnetic flux amplitude regardless of the value of the magnetic flux amplitude because the gain used in calculating the operating speed of the actuator 2 is made variable according to the amount of the magnetic flux amplitude command.

Depending on a driving mechanism of the actuator 2 and performance characteristics of this driving mechanism, however, these may arise problem that the operating speed of the actuator 2 can not follow the speed command. Discussed below is how the current command calculator 13 works to solve this problem.

Figure 8:
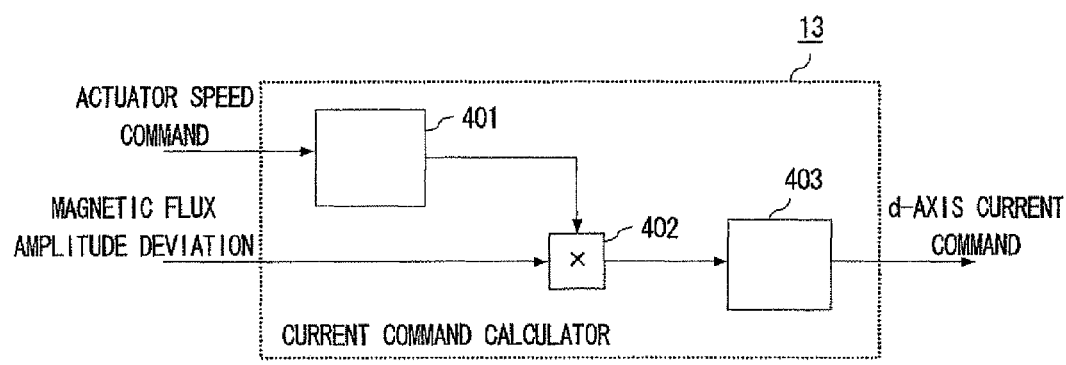
FIG. 8 is a diagram showing an internal configuration of a current command calculator of the control apparatus of the first embodiment.

FIG. 8 is a diagram showing an internal configuration of the current command calculator 13. The current command calculator 13 includes a gain table 401 for outputting a gain which is varied according to the actuator speed command and a multiplier 402 for multiplying the magnetic flux amplitude deviation by the gain output from the gain table 401 and outputting the result of this multiplication. The current command calculator 13 further includes a limiter 403 which limits the output of the multiplier 402 such that the d-axis current command falls within a specified range and outputs the d-axis current command thus limited.

Figure 9:
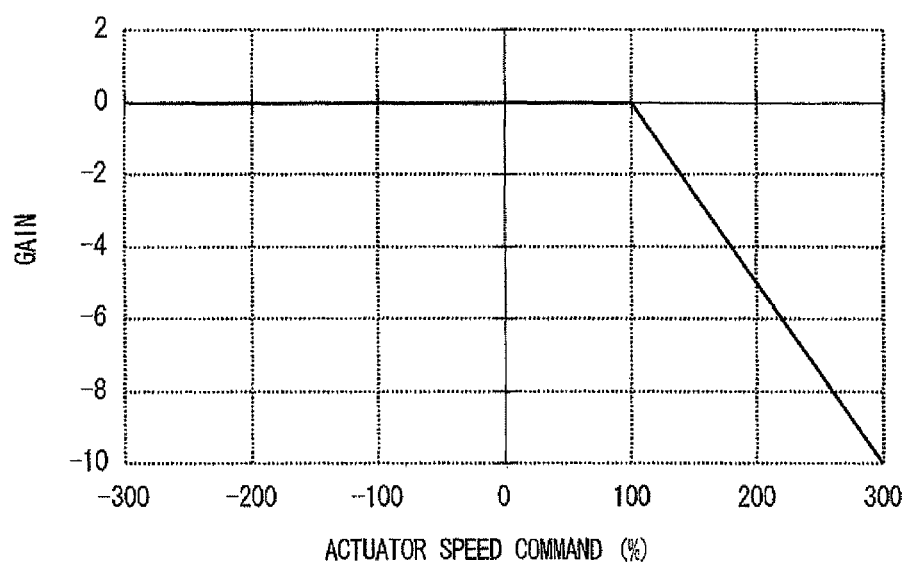
FIG. 9 is a diagram showing a plotting of gain values that a gain table provided in the current command calculator of FIG. 8 outputs according to an actuator speed command.

FIG. 9 is a diagram showing a plotting of values of the gain that the gain table 401 outputs according to the actuator speed command. The speed command calculator 12 decreases the value of the actuator speed command when it is desired to increase the magnetic flux amplitude, whereas the speed command calculator 12 increases the value of the actuator speed command when it is desired to decrease the magnetic flux amplitude. However, there are limitations on a range of the actuator speed and, therefore, the operating speed of the actuator 2 does not follow the actuator speed command when the actuator speed command goes out of a range of finite limits. When the value of the actuator speed command is lower than a range in which the actuator 2 can turn the first stator element 101, there occurs such a phenomenon that the magnetic flux amplitude can not follow the magnetic flux amplitude command although it is desired to increase the magnetic flux amplitude. When the value of the actuator speed command is higher than this range in which the actuator 2 can turn the first stator element 101, on the contrary, there occurs such a phenomenon that the magnetic flux amplitude can not follow the magnetic flux amplitude command although it is desired to decrease the magnetic flux amplitude.

When the magnetic flux amplitude is smaller than the value of the magnetic flux amplitude command, a voltage induced in the AC rotary machine 1 simply becomes smaller than a specified voltage level. When the magnetic flux amplitude is larger than the value of the actuator speed command, on the other hand, the voltage induced in the AC rotary machine 1 becomes larger than the specified voltage level and, as a consequence, the induced voltage produced in the AC rotary machine 1 may go out of an output voltage range of the PWM inverter 3 in some cases.

On the other hand, when the d-axis current command is set to have a negative value, it is possible to reduce the induced voltage produced in the AC rotary machine 1 as a result of operation known as flux-weakening control. Thus, if the magnetic flux amplitude can not follow the magnetic flux amplitude command although it is desired to decrease the magnetic flux amplitude, a gain table as shown in FIG. 9 is set to produce a d-axis current command when the actuator speed command has a value larger than +100% in order to prevent the induced voltage produced in the AC rotary machine 1 from becoming higher than the specified voltage level. When the actuator speed command has a value smaller than +100%, the gain table 401 outputs a zero value so that no d-axis current command is generated.

As explained in the foregoing discussion, the actuator speed command calculator 9 calculates a current command having a vectorial value equivalent to the magnetic flux produced by the rotor 103 of the AC rotary machine 1, or a d-axis current command expressed in the dual-axis (dq-axis) rotating coordinate system, according to the actuator speed command and the magnetic flux amplitude command, and the voltage command calculator 5 generates and outputs voltage commands indicating the voltages to be applied by the PWM inverter (voltage applicator) 3 such that the d-axis current expressed in the dual-axis (dq-axis) rotating coordinate system, or a current component having the same vectorial value as the magnetic flux produced by the rotor 103 corresponding to the currents detected and output by the current sensor 4, coincides with the d-axis current command. As a result, there is created such an advantage that the amount of the induced voltage produced in the AC rotary machine 1 can be held within the aforementioned output voltage range of the PWM inverter 3 even when the operating speed of the actuator 2 can not be controlled to follow the actuator speed command.

As thus far described, the control apparatus of the above-described first embodiment is provided with the actuator speed command calculator 9 which generates and outputs the actuator speed command to the actuator controller 14 such that the actuator 2 operates according to the detected currents output from the current sensor 4, the voltage commands and the magnetic flux amplitude command. This arrangement of the embodiment produces such an advantage that the amplitude of the magnetic flux produced by the rotor 103 of the AC rotary machine 1 can be so controlled as to match a desired value without using a position sensor for detecting the phase difference $\Delta\theta$ between the first stator element 101 and the second stator element 102.

Additionally, the actuator speed command calculator 9 calculates the estimated magnetic flux amplitude based on the detected currents output from the current sensor 4 and the voltage commands and then calculates the actuator speed command in such a manner that the estimated magnetic flux amplitude coincides with the magnetic flux amplitude command. This arrangement of the embodiment produces such an advantage that it is possible to use an inexpensive actuator only if the actuator controller 14 can control the speed of the actuator 2 even if the actuator controller 14 can not control rotational position of the actuator 2.

Also, the actuator speed command calculator 9 is provided with the magnetic flux estimator 10 for calculating the estimated magnetic flux amplitude based on the detected currents output from the current sensor 4 and the voltage commands and the speed command calculator 12 for calculating the actuator speed command based on a deviation of the estimated magnetic flux amplitude from the value of the magnetic flux amplitude command output from the subtracter 11. This arrangement of the embodiment produces such an advantage that it is not necessary to detect the phase difference Δθ between the first stator element 101 and the second stator element 102 for calculating the amplitude of the magnetic flux produced by the rotor 103, so that the amplitude of the magnetic flux produced by the rotor 103 of the AC rotary machine 1 can be so controlled as to match a desired value without using a position sensor for detecting the phase difference Δθ.

Also, the actuator speed command calculator 9 is provided with the magnetic flux estimator 10 for calculating the estimated magnetic flux amplitude based on the detected currents output from the current sensor 4 and the voltage commands and the speed command calculator 12 for calculating the actuator speed command based on the deviation of the estimated magnetic flux amplitude from the value of the magnetic flux amplitude command output from the subtracter 11 and on the magnetic flux amplitude command as discussed above. This arrangement of the embodiment is advantageous in that the gain used in calculating the operating speed of the actuator 2 can be made variable according to the amount of the magnetic flux amplitude command and, thus, the same level of response can be maintained in controlling the magnetic flux amplitude regardless of the value of the magnetic flux amplitude command.

The control apparatus of the first embodiment is so configured that the actuator speed command calculator 9 generates and outputs the actuator speed command to the actuator controller 14 such that the actuator 2 operates according to the detected currents output from the current sensor 4, the voltage commands and the magnetic flux amplitude command and the magnetic flux estimator 10 outputs the estimated rotating speed and the estimated magnetic flux phase of the AC rotary machine 1, the voltage command calculator 5 generates and outputs the voltage commands indicating the voltages to be applied by the PWM inverter 3 based on the estimated magnetic flux phase and the detected currents output from the current sensor 4, and the magnetic flux command calculator 15 generates and outputs the magnetic flux amplitude command which defines the amplitude of rotor magnetic flux according to the aforementioned estimated rotating speed. This arrangement of the embodiment is advantageous in that the speed of the AC rotary machine 1 can be variably controlled without requiring any sensor for detecting the rotational position of the AC rotary machine 1.

Whale the actuator controller 14 detects the operating speed of the actuator 2 and controls the actuator 2 such that this operating speed matches the actuator speed command in the above-described control apparatus of the first embodiment, a rotating speed sensor is not necessarily needed for performing this control operation. For example, when a DC rotary machine is used as a driving device of the actuator 2, the aforementioned control operation can be performed by simply varying voltage applied across terminals of the DC rotary machine by using a known property thereof that the operating speed of the same is proportional to its terminal voltage. Also, when an induction machine is used as a driving device of the actuator 2, the operating speed of the same can be controlled by a variable frequency control method known as constant V/f control based on the fact that the amplitude of AC voltage applied to the induction machine is proportional to the frequency of AC voltage. Accordingly, the configuration of the present invention as described in the foregoing first embodiment is advantageous in that the actuator 2 can employ an inexpensive driving device having no phase difference detecting capability, such as a DC rotary machine or an induction machine operated by constant V/f control.

Second Embodiment

While the current command calculator 13 generates and outputs the d-axis current command expressed in the dual-axis (dq-axis) rotating coordinate system by amplifying the magnetic flux amplitude deviation when the absolute value of the actuator speed command exceeds a specific value in the above-described first embodiment, the invention is not limited to this arrangement. For example, it is possible to eliminate the current command calculator 13 if the control apparatus is provided with such an actuator controller 14 that the operating speed of the actuator 2 can sufficiently follow the actuator speed command.

Figure 10:
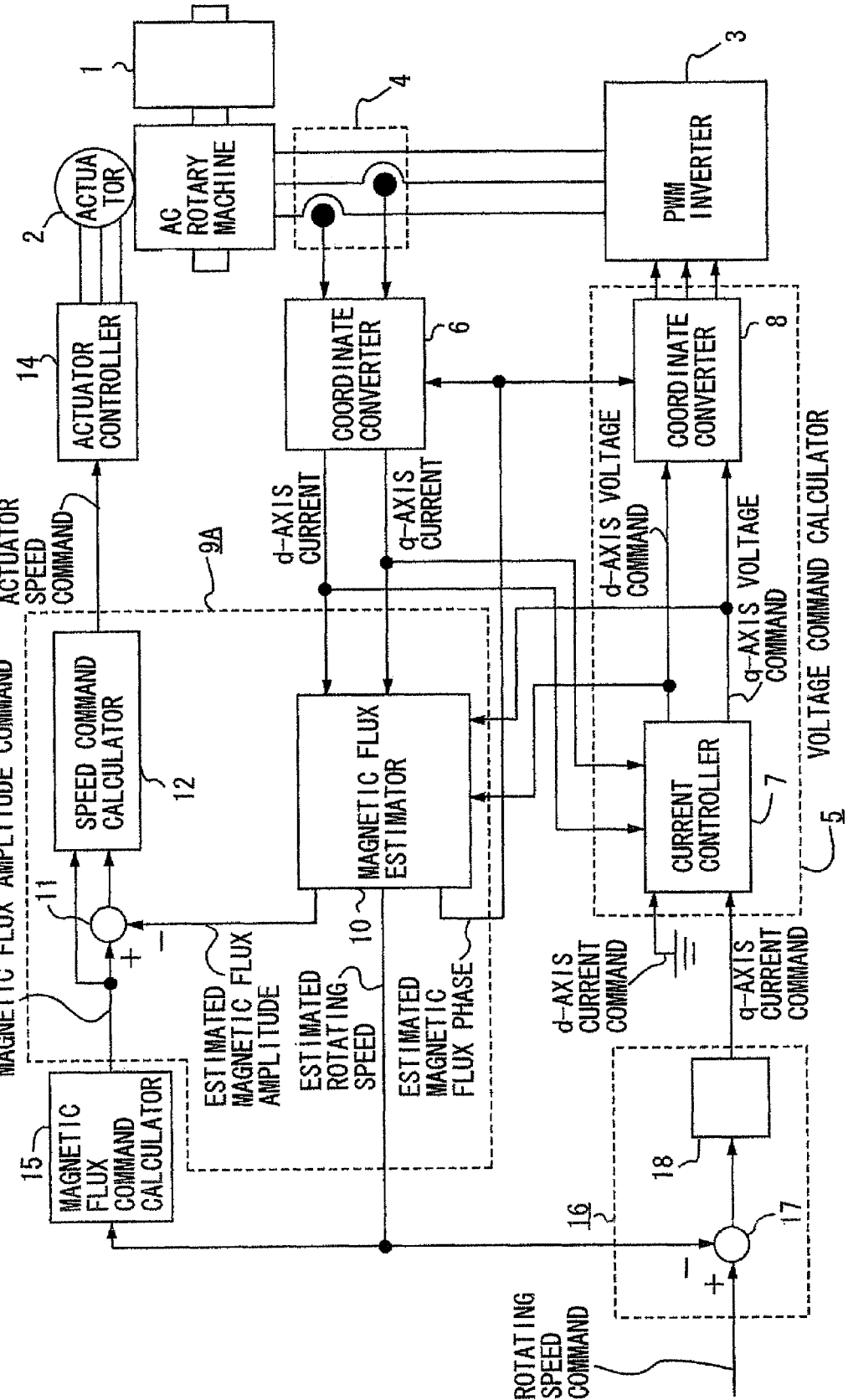
FIG. 10 is a block diagram of a control apparatus for controlling an AC rotary machine according to a second embodiment of the invention.

A control apparatus for controlling an AC rotary machine 1 according to a second embodiment of the present invention shown in FIG. 10 is now described. Referring to FIG. 10, the control apparatus is provided with an actuator speed command calculator 9a which includes a magnetic flux estimator 10, a subtracter 11 and a speed command calculator 12 as well as a voltage command calculator 5 of which d-axis current command input is kept constantly at zero level. The control apparatus of this embodiment is configured otherwise the same way as that of the first embodiment, and any identical part of the control apparatus is not described here again.

As the second embodiment does not require the current command calculator 13 for calculating the d-axis current command, mathematical operation performed by the control apparatus is simplified by a corresponding amount.

Also, as the d-axis current is held always at zero, the q-axis current command expressed in the dual-axis (dq-axis) rotating coordinate system output from the speed controller 16 is the only current command that is input into the voltage command calculator 5. Electric current produced in an AC rotary machine 1 is equal to the root of the sum of the squares of the d-axis current and the q-axis current. Therefore, electric current produced in the AC rotary machine 1 is minimized with the d-axis current held constantly at zero level.

Third Embodiment

While the speed command calculator 12 calculates the actuator speed command defining the speed at which the actuator 2 should run based on the magnetic flux amplitude command and the magnetic flux amplitude deviation in the above-described first and second embodiments, the invention is not limited to this arrangement. For example, it is possible to use the estimated magnetic flux amplitude output from the magnetic flux estimator 10 instead of the magnetic flux amplitude command for the same purpose.

Figure 11:
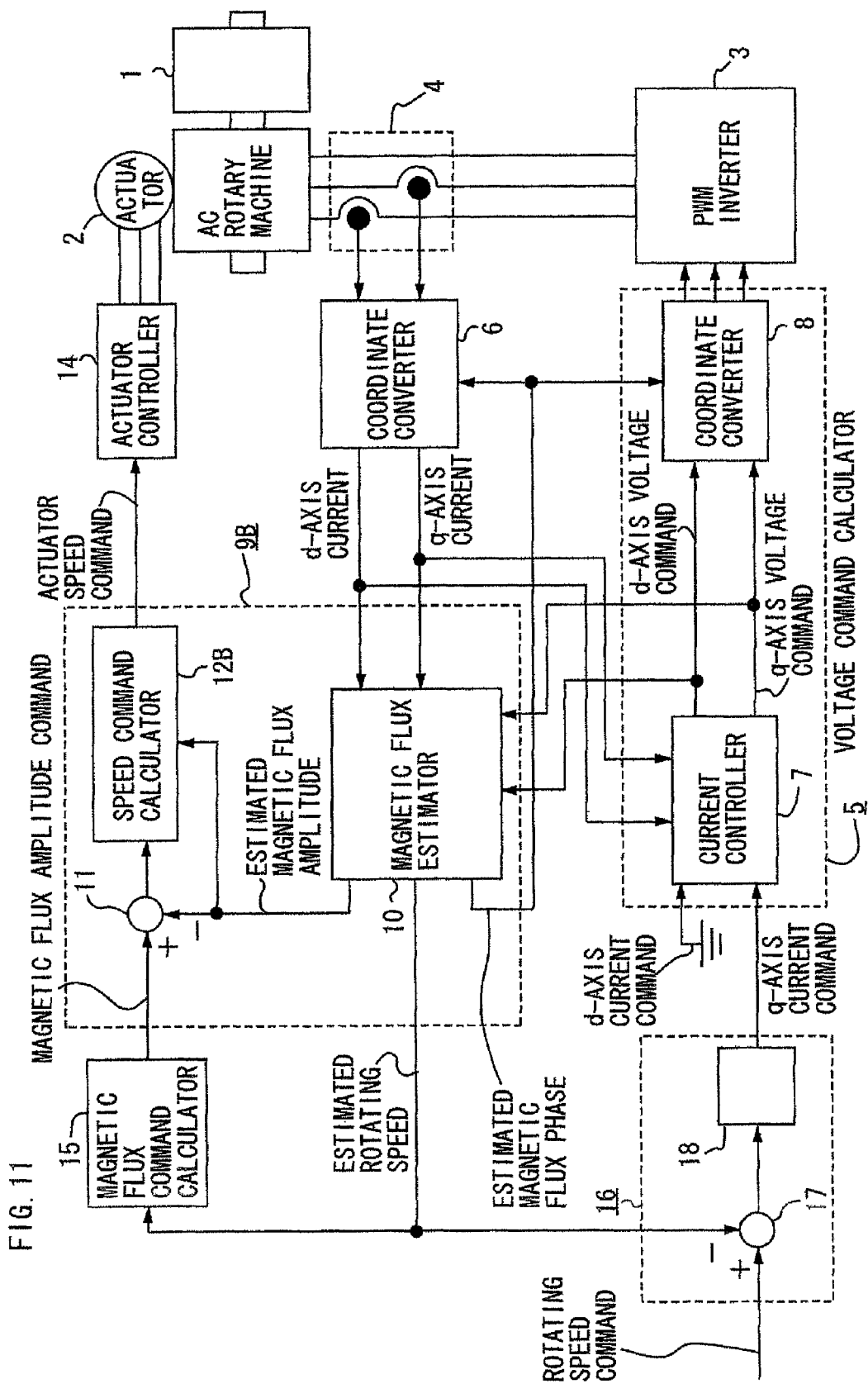
FIG. 11 is a block diagram of a control apparatus for controlling an AC rotary machine according to a third embodiment of the invention.

A control apparatus for controlling an AC rotary machine 1 according to a third embodiment of the present invention shown in FIG. 11 is now described. Referring to FIG. 11, the control apparatus is provided with an actuator speed command calculator 9b which includes a speed command calculator 12b for calculating the actuator speed command defining the speed at which the actuator 2 should run based on the estimated magnetic flux amplitude output from the magnetic flux estimator 10 and the magnetic flux amplitude deviation output from the subtracter 11. The control apparatus of this embodiment is configured otherwise the same way as that of the first embodiment, and any identical part of the control apparatus is not described here again.

In this embodiment, the estimated magnetic flux amplitude equals the value of the magnetic flux amplitude command when the estimated magnetic flux amplitude follows the magnetic flux amplitude command with sufficiently high response. It is therefore possible to create the same advantageous effect as the foregoing embodiments even when the estimated magnetic flux amplitude is used instead of the magnetic flux amplitude command. In addition, with the use of the estimated magnetic flux amplitude instead of the magnetic flux amplitude command, a gain table provided in the speed command calculator 12b outputs a gain which is varied according to the estimated magnetic flux amplitude, so that the above-described configuration of the third embodiment makes it possible to maintain the same level of response in controlling the magnetic flux amplitude even when there is a delay in response of the estimated magnetic flux amplitude with respect to the magnetic flux amplitude command.

Fourth Embodiment

While the speed command calculator 12 calculates the actuator speed command defining the speed at which the actuator 2 should run based on the magnetic flux amplitude command and the magnetic flux amplitude deviation in the above-described first and second embodiments, the invention is not limited to this arrangement. For example, it is possible to calculate the actuator speed command by amplifying the magnetic flux amplitude deviation.

Figure 12:
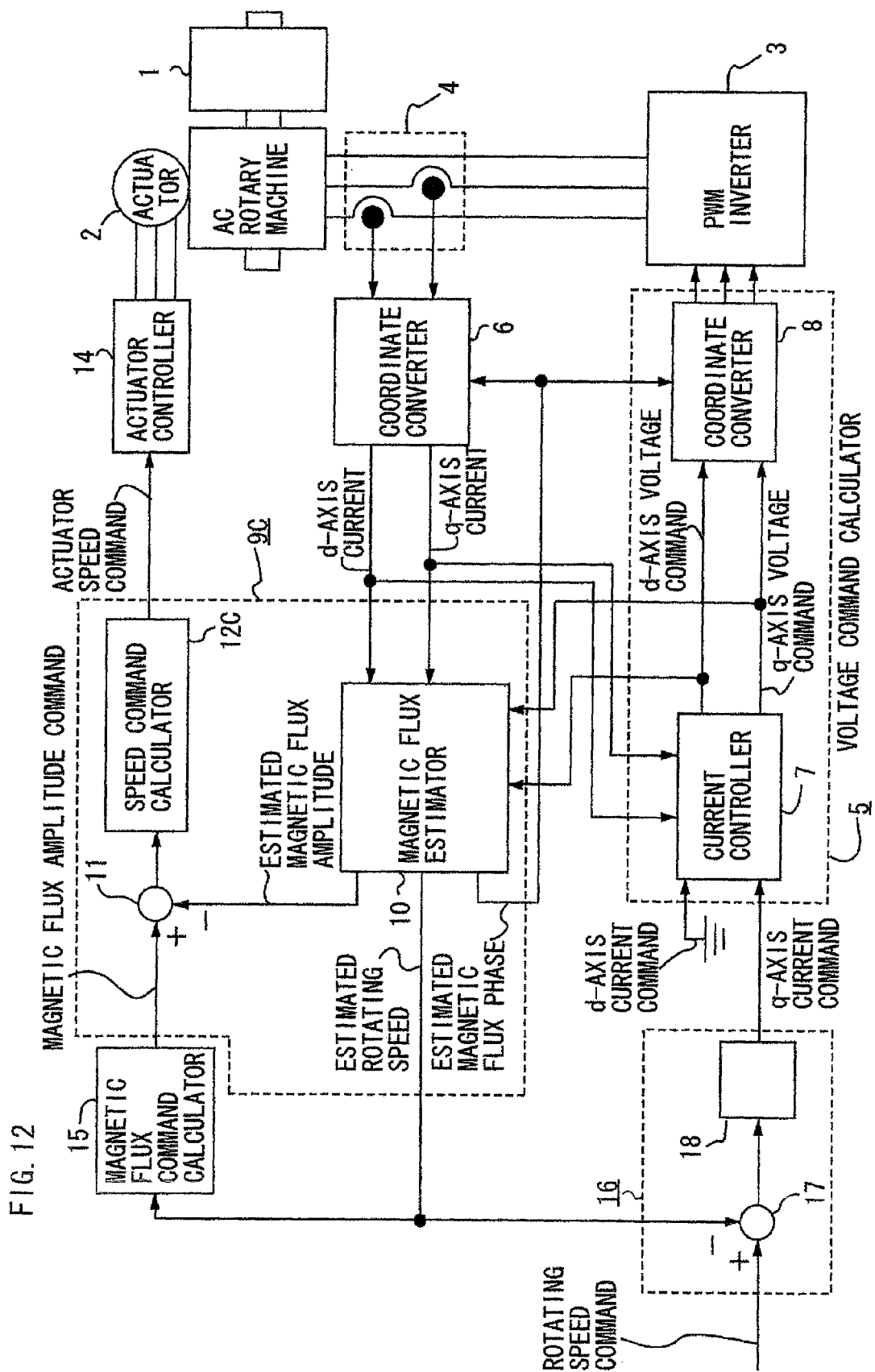
FIG. 12 is a block diagram of a control apparatus for controlling an AC rotary machine according to a fourth embodiment of the invention.

A control apparatus for controlling an AC rotary machine 1 according to a fourth embodiment of the present invention shown in FIG. 12 is now described. Referring to FIG. 12, the control apparatus is provided with an actuator speed command calculator 9c which includes a speed command calculator 12c for calculating the actuator speed command defining the speed at which the actuator 2 should run based on the estimated magnetic flux amplitude output from the magnetic flux estimator 10 and the magnetic flux amplitude deviation output from the subtracter 11. The control apparatus of this embodiment is configured otherwise the same way as that of the first embodiment, and any identical part of the control apparatus is not described here again.

The speed command calculator 12c amplifies the magnetic flux amplitude deviation and outputs the amplified magnetic flux amplitude deviation as the actuator speed command. The speed command calculator 12c may output either a value proportional to an input of the speed command calculator 12c or a value obtained by proportionally integrating the input as the actuator speed command.

Although the speed command calculator 12c of the fourth embodiment can not maintain the same level of response in controlling the magnetic flux amplitude regardless of the value of the magnetic flux amplitude unlike the foregoing embodiments, the fourth embodiment can otherwise produce the same advantageous effect as the above-described first and second embodiments.

Fifth Embodiment

While the speed command calculator 12 (12b) produces the above-described effect of maintaining the same level of response in controlling the magnetic flux amplitude regardless of the value of the magnetic flux amplitude by calculating the actuator speed command defining the speed at which the actuator 2 should run based on the magnetic flux amplitude command, or the estimated magnetic flux amplitude, and the magnetic flux amplitude deviation in each of the aforementioned first to third embodiments, the invention is not limited to this arrangement. A fifth embodiment described below is one variation of the present invention which provides the same advantageous effect as the foregoing embodiments.

Figure 13:
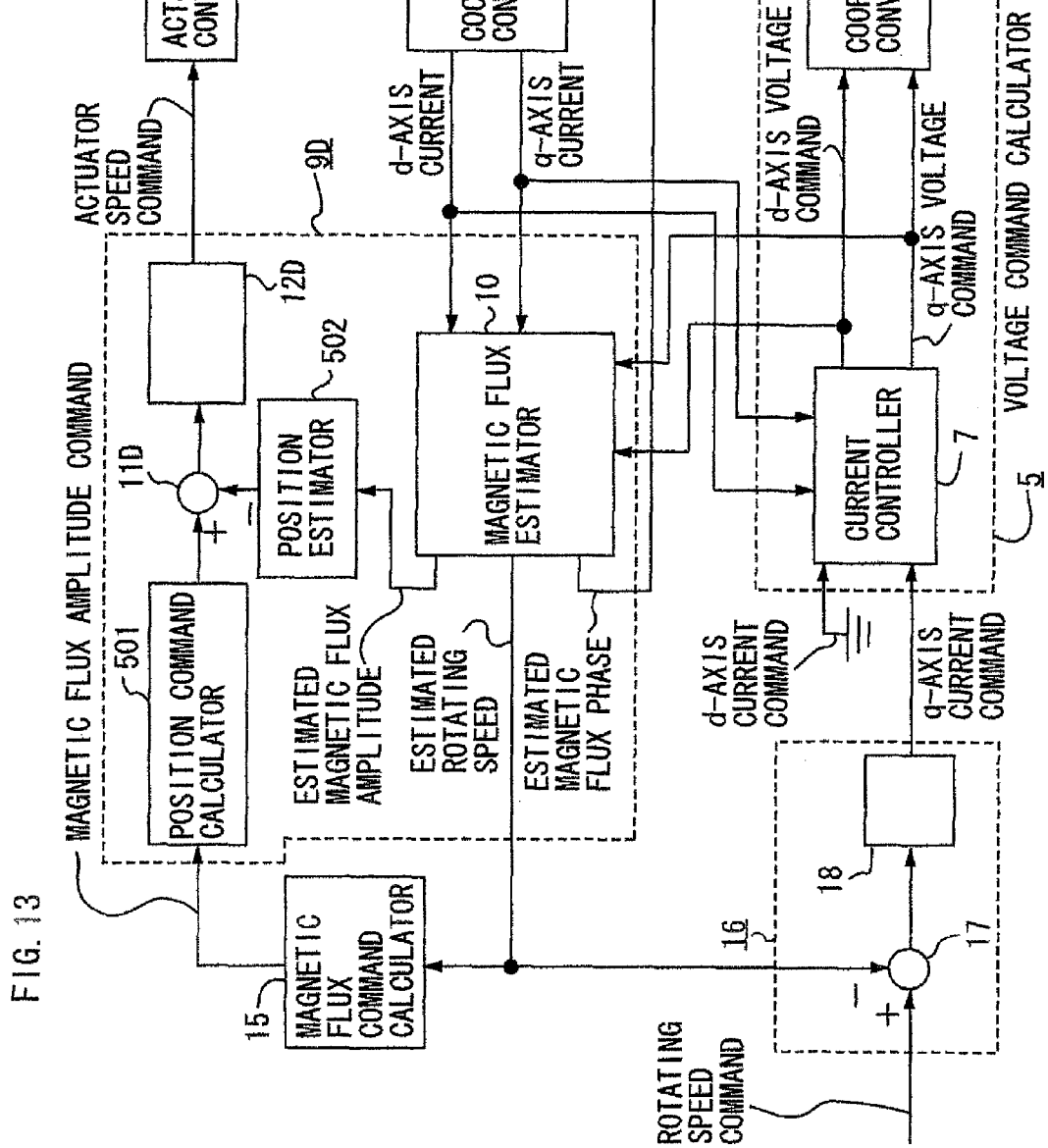
FIG. 13 is a block diagram of a control apparatus for controlling an AC rotary machine according to a fifth embodiment of the invention.

A control apparatus for controlling an AC rotary machine 1 according to the fifth embodiment of the present invention shown in FIG. 13 is now described. Referring to FIG. 13, the control apparatus is provided with an actuator speed command calculator 9d which includes a position command calculator 501 for calculating a position command indicating an angular position that the actuator 2 should take based on the magnetic flux amplitude command, a magnetic flux estimator 10 for calculating estimated magnetic flux amplitude based on detected currents output from the current sensor 4 and voltage commands, a position estimator 502 for calculating an estimated angular position (estimated phase difference $\Delta\theta$) of the actuator 2 based on the estimated magnetic flux amplitude, a subtracter 11d and a speed command calculator 12d for calculating the actuator speed command by amplifying a deviation of the estimated angular position from the angular position indicated by the position command.

The speed command calculator 12d may output either a value proportional to an input of the speed command calculator 12d or a value obtained by proportionally integrating the input as the actuator speed command. The control apparatus of this embodiment is configured otherwise the same way as that of the first embodiment, and any identical part of the control apparatus is not described here again.

Figure 14:
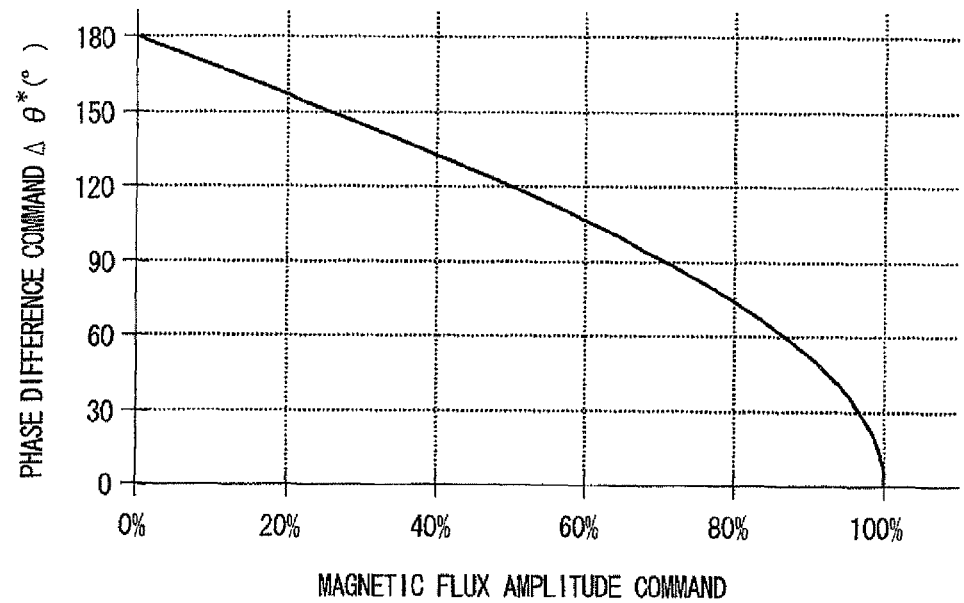
FIG. 14 is a diagram showing a table used by a position command calculator shown in FIG. 13 for calculating a position command (phase difference command Δθ*) representative of an angular position at which an actuator of the control apparatus of the fifth embodiment should be located based on the magnetic flux amplitude command.

FIG. 14 is a diagram showing a table used for calculating the position command (phase difference command $\Delta\theta^*$) indicating the angular position that the actuator 2 should take based on the magnetic flux amplitude command. This table can be obtained from the relationship between the magnetic flux amplitude and the phase difference $\Delta\theta$ shown in FIG. 5.

Figure 15:
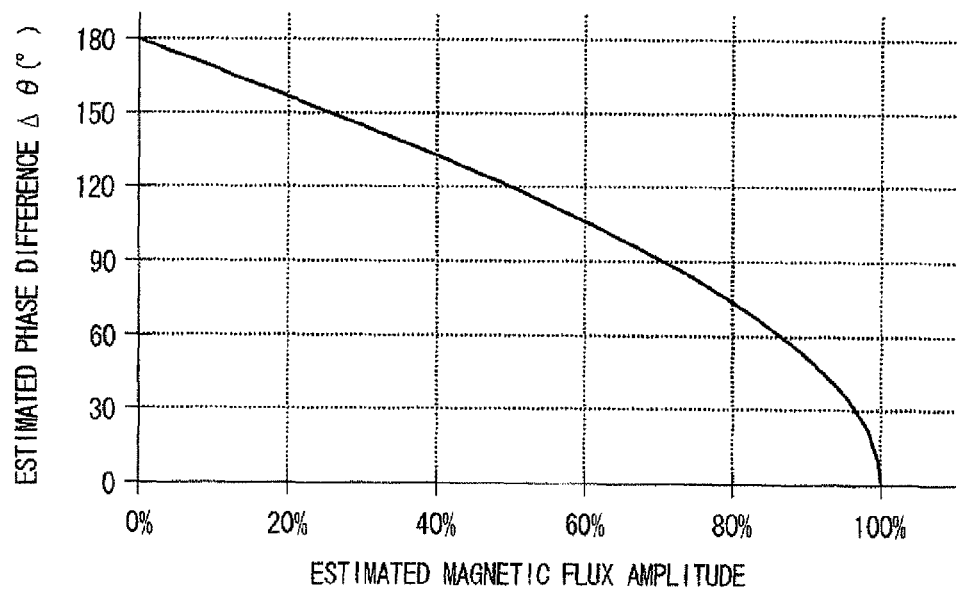
FIG. 15 is a diagram showing a table used by a position estimator shown in FIG. 13 for calculating an estimated angular position (estimated phase difference Δθ) of the actuator.

FIG. 15 is a diagram showing a table used by the position estimator 502 for calculating the estimated angular position (estimated phase difference $\Delta\theta$) of the actuator 2. This table can also be obtained from the relationship between the magnetic flux amplitude and the phase difference $\Delta\theta$ shown in FIG. 5.

As the control apparatus of the fifth embodiment thus configured makes it possible to control the AC rotary machine 1 upon once converting the magnetic flux amplitude command into the position command, the above-described configuration of the embodiment also produces the effect of maintaining the same level of response in controlling the magnetic flux amplitude regardless of the value of the magnetic flux amplitude.

Sixth Embodiment

While the actuator speed command calculator 9 (9a, 9b, 9c, 9d) calculates and outputs the actuator speed command defining the speed at which the actuator 2 should run based on detected currents output from the current sensor 4, voltage commands and a magnetic flux amplitude command in each of the foregoing embodiments, it is known that the accuracy of calculating estimated rotating speed of the magnetic flux estimator 10 provided in the actuator speed command calculator 9 (9a, 9b, 9c, 9d) deteriorates in a low-speed region in which the induced voltage produced in the AC rotary machine 1 is low.

Under this circumstance, the above-described configuration of the control apparatus may be so modified that the control apparatus further includes a rotating speed sensor for detecting the rotating speed of the AC rotary machine 1 and the actuator speed command calculator 9 (9a, 9b, 9c, 9d) calculates the actuator speed command by using also a rotating speed obtained by the rotating speed sensor and outputs the actuator speed command thus generated to the actuator controller 14.

Figure 16:
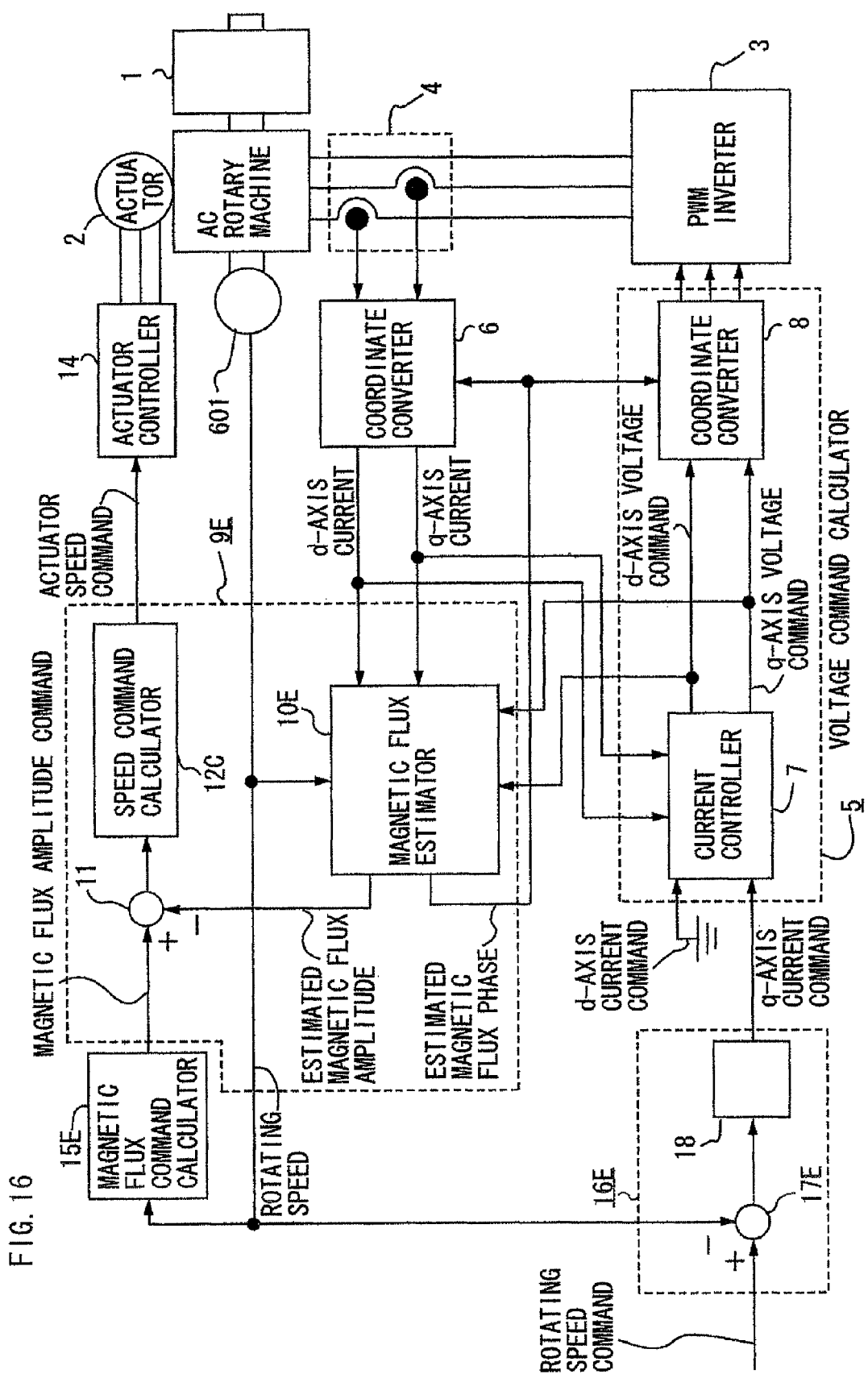
FIG. 16 is a block diagram of a control apparatus for controlling an AC rotary machine according to a sixth embodiment of the invention.

A control apparatus for controlling an AC rotary machine 1 according to a sixth embodiment of the present invention includes the aforementioned kind of rotating speed sensor 601 for detecting the rotating speed of the AC rotary machine 1 as shown in FIG. 16. Referring to FIG. 16, the control apparatus includes, in addition to the rotating speed sensor 601 for detecting the rotating speed of the AC rotary machine 1, an actuator speed command calculator 9e which incorporates a magnetic flux estimator 10e, a subtracter 11 and a speed command calculator 12c. The actuator speed command calculator 9e calculates the actuator speed command defining the speed at which the actuator 2 should run based on the rotating speed of the AC rotary machine 1 obtained from the rotating speed sensor 601, the currents detected by the current sensor 4, the voltage commands and the magnetic flux amplitude command and outputs the actuator speed command thus generated to the actuator controller 14 while outputting also the estimated magnetic flux phase.

The magnetic flux estimator 10e generates and outputs the estimated magnetic flux amplitude and the estimated rotating speed of the AC rotary machine 1 based on the d- and q-axis voltage commands and the d- and q-axis currents expressed in the dual-axis (dq-axis) rotating coordinate system and on the rotating speed of the AC rotary machine 1 obtained from the rotating speed sensor 601.

The control apparatus further includes a magnetic flux command calculator 15e instead of the magnetic flux command calculator 15 discussed in the foregoing embodiments. While the magnetic flux command calculator 15 of the foregoing embodiments generates and outputs the magnetic flux amplitude command based on the estimated rotating speed, the magnetic flux command calculator 15e of the present embodiment generates and outputs the magnetic flux amplitude command based on the rotating speed of the AC rotary machine 1 obtained from the rotating speed sensor 601 instead of the estimated rotating speed.

The control apparatus further includes a speed controller 16e instead of the speed controller 16 discussed in the foregoing embodiments, the speed controller 16e including a subtracter 17e and a speed control device 18. In the speed controller 16 of the foregoing embodiments, the subtracter 17 generates the rotating speed deviation by subtracting the estimated rotating speed obtained from the actuator speed command calculator 9 from the input rotating speed command and outputs the rotating speed deviation thus calculated and, then, the speed control device 18 generates the q-axis current command expressed in the dual-axis (dq-axis) rotating coordinate system by amplifying the rotating speed deviation and outputs the q-axis current command thus generated. In the speed controller 16e of the present embodiment, however, the subtracter 17e generates the rotating speed deviation by subtracting the rotating speed of the AC rotary machine 1 obtained from the rotating speed sensor 601 from the input rotating speed command and outputs the rotating speed deviation thus calculated and, then, the speed control device 18 generates the q-axis current command expressed in the dual-axis (dq-axis) rotating coordinate system by amplifying the rotating speed deviation and outputs the q-axis current command thus generated.

The control apparatus of this embodiment is configured otherwise the same way as that of the first embodiment, and any identical part of the control apparatus is not described here again.

Figure 17:
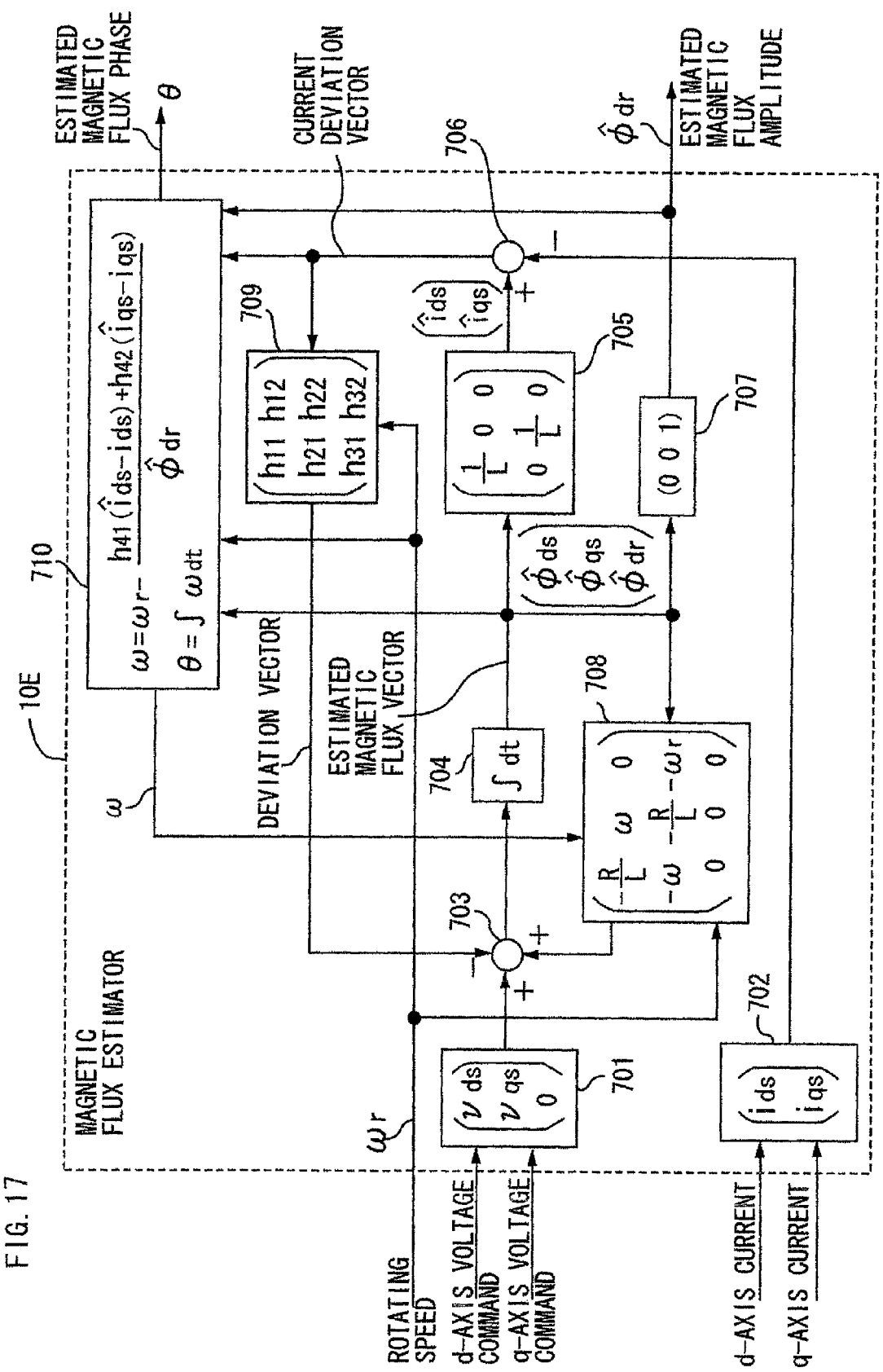
FIG. 17 is a diagram showing an internal configuration of a magnetic flux estimator employed in the control apparatus of the sixth embodiment of FIG. 16.

FIG. 17 is a diagram showing an internal configuration of the magnetic flux estimator 10e of the control apparatus of the sixth embodiment. Referring to FIG. 17, the magnetic flux estimator be includes a voltage vector calculator 701, a current vector calculator 702, an adder-subtracter 703, an integrator 704, a matrix gain calculator 705, a subtracter 706, matrix gain calculators 707-709 and a phase calculator 710.

The voltage vector calculator 701 generates and outputs the d- and q-axis voltage commands expressed in the dual-axis (dq-axis) rotating coordinate system in the form of a voltage vector given below:

$$\text{Voltage vector} = \begin{pmatrix} v_{ds} \\ v_{qs} \\ 0 \end{pmatrix}$$

The current vector calculator 702 calculates and outputs the d- and q-axis currents expressed in the dual-axis (dq-axis) rotating coordinate system in the form of a current vector given below:

$$\text{Current vector} = \begin{pmatrix} i_{ds} \\ i_{qs} \end{pmatrix}$$

The adder-subtracter 703 calculates and outputs the vector sum of the voltage vector output from the voltage vector calculator 701, a state vector output from the later-discussed matrix gain calculator 708 and a deviation vector output from the later-discussed matrix gain calculator 709, where the state vector and the deviation vector are expressed as follows:

$$\text{State vector} = \begin{pmatrix} -\frac{R}{L}\hat{\phi}_{ds} + \omega\hat{\phi}_{qs} \\ -\omega\hat{\phi}_{ds} - \frac{R}{L}\hat{\phi}_{qs} - \omega_r\hat{\phi}_{dr} \\ 0 \end{pmatrix}$$

$$\text{Deviation vector} = \begin{pmatrix} h_{11}(\hat{i}_{ds} - i_{ds}) + h_{12}(\hat{i}_{qs} - i_{qs}) \\ h_{21}(\hat{i}_{ds} - i_{ds}) + h_{22}(\hat{i}_{qs} - i_{qs}) \\ h_{31}(\hat{i}_{ds} - i_{ds}) + h_{32}(\hat{i}_{qs} - i_{qs}) \end{pmatrix}$$

The integrator 704 calculates and outputs a magnetic flux vector shown below by integrating the vector output from the adder-subtracter 703:

$$\text{Magnetic flux vector} = \begin{pmatrix} \hat{\phi}_{ds} \\ \hat{\phi}_{qs} \\ \hat{\phi}_{dr} \end{pmatrix}$$

The aforementioned magnetic flux vector is a vector having as constituent elements estimated d-axis armature reaction $\hat{\phi}ds$, estimated q-axis armature reaction $\hat{\phi}qs$ and estimated magnetic flux amplitude $\hat{\phi}dr$ expressed in the dual-axis (dq-axis) rotating coordinate system of the AC rotary machine 1.

The matrix gain calculator 705 multiplies the aforementioned magnetic flux vector by a specified matrix shown below:

$$\text{Specified matrix} = \begin{pmatrix} \frac{1}{L} & 0 & 0 \\ 0 & \frac{1}{L} & 0 \end{pmatrix}$$

to generate and output an estimated current vector shown below:

$$\text{Estimated current vector} = \begin{pmatrix} \hat{i}_{ds} \\ \hat{i}_{qs} \end{pmatrix}$$

The specified matrix used by the matrix gain calculator 705 in the aforementioned calculation contains elements defined by an inductance value L of the AC rotary machine 1.

The subtracter 706 generates and outputs a current deviation vector shown below by subtracting a current vector obtained from the current vector calculator 702 from the aforementioned estimated current vector:

$$\text{Current deviation vector} = \begin{pmatrix} \hat{i}_{ds} - i_{ds} \\ \hat{i}_{qs} - i_{qs} \end{pmatrix}$$

The matrix gain calculator 707 extracts the estimated magnetic flux amplitude $\hat{\phi}dr$ by multiplying the aforementioned magnetic flux vector by a specified matrix shown below:

Specified matrix=(0 0 1)

The matrix gain calculator 708 generates the earlier-mentioned state vector by multiplying the aforementioned magnetic flux vector by a matrix shown below which is defined by the rotating speed $\omega_r$ obtained from the rotating speed sensor 601, a primary frequency $\omega$ as well as resistance R and inductance L of the AC rotary machine 1, and outputs the result of this multiplication, or the state vector, to the adder-subtracter 703:

$$\text{Matrix} = \begin{pmatrix} -\frac{R}{L} & \omega & 0 \\ -\omega & -\frac{R}{L} & -\omega_r \\ 0 & 0 & 0 \end{pmatrix}$$

The matrix gain calculator 709 multiplies the aforementioned current deviation vector obtained from the subtracter 706 by a matrix shown below:

$$\text{Matrix} = \begin{pmatrix} h_{11} & h_{12} \\ h_{21} & h_{22} \\ h_{31} & h_{32} \end{pmatrix}$$

where h11, h12, h21, h22, h31 and h32 are functions defined by the rotating speed $\omega_r$ obtained from the rotating speed sensor 601. The result of this multiplication obtained by the matrix gain calculator 709 is delivered to the adder-subtracter 703 as the aforementioned deviation vector.

The phase calculator 710 calculates and outputs the aforementioned primary frequency $\omega$ and estimated magnetic flux phase $\theta$ by the following equation using the rotating speed $\omega_r$ obtained from the rotating speed sensor 601 and the aforementioned current deviation vector and estimated magnetic flux amplitude:

$$\omega = \omega_r - \frac{h_{41}(\hat{i}_{ds} - i_{ds}) + h_{42}(\hat{i}_{qs} - i_{qs})}{\hat{\phi}_{dr}}$$

where $\theta = \int \omega dt$.

The control apparatus of the sixth embodiment having the above-described configuration is provided with the rotating speed sensor 601 for detecting the rotating speed of the AC rotary machine 1 and the actuator speed command calculator 9e calculates the actuator speed command by using also the rotating speed obtained from the rotating speed sensor 601 and outputs the actuator speed command thus generated.

To be more specific, the control apparatus of the sixth embodiment is provided with the rotating speed sensor 601 for detecting the rotating speed of the AC rotary machine 1 and the magnetic flux estimator 10e provided in the actuator speed command calculator 9e generates the estimated magnetic flux amplitude and the estimated rotating speed of the AC rotary machine 1 by using also the rotating speed obtained from the rotating speed sensor 601. Accordingly, the configuration of the sixth embodiment makes it possible to achieve good calculating accuracy even in a low-speed region of the AC rotary machine 1 and to operate the AC rotary machine 1 in a steady fashion without any substantial error in the angular position of the rotor 103 even when the amount of induced voltage produced in the AC rotary machine 1 is large and the estimated phase difference $\Delta\theta$ varies.

Seventh Embodiment

Now, a control apparatus for controlling an AC rotary machine 1 according to a seventh embodiment of the present invention is described. What is characteristic of this embodiment is that the control apparatus includes a position sensor 801 for detecting the rotational position of the AC rotary machine 1, a rotating speed calculator 802 for calculating the rotating speed of the AC rotary machine 1 based on the rotational position thereof obtained from the position sensor 801, and an actuator speed command calculator 9f which calculates an actuator speed command specifying a speed at which the actuator 2 should run based on the rotational position of the AC rotary machine 1 obtained from the rotating speed calculator 802, detected currents output from the current sensor 4, voltage commands and a magnetic flux amplitude command and outputs the actuator speed command thus generated to the actuator controller 14.

Figure 18:
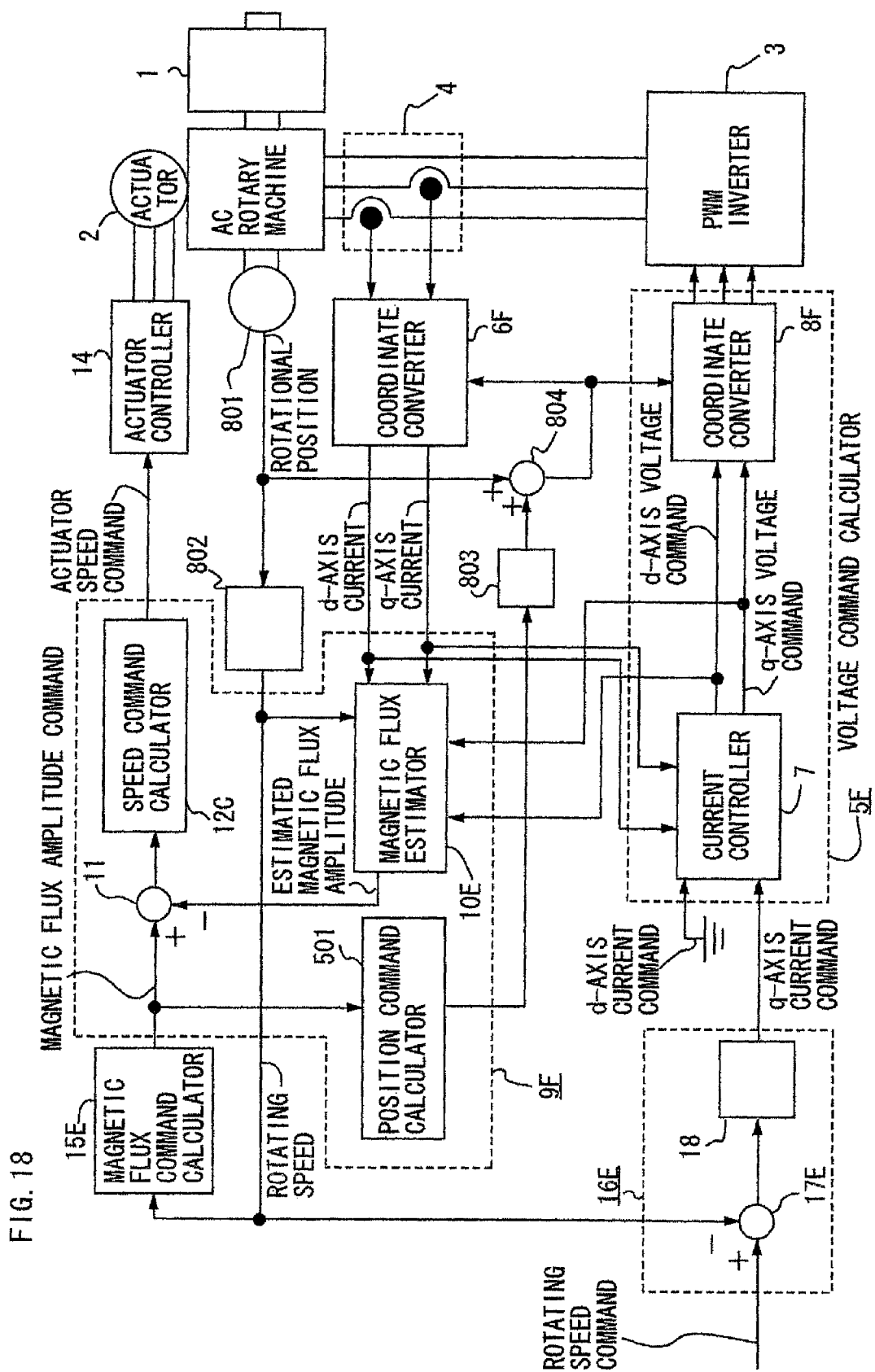
FIG. 18 is a block diagram of a control apparatus for controlling an AC rotary machine according to a seventh embodiment of the invention.

The control apparatus of the seventh embodiment shown in FIG. 18 is described in detail below. The control apparatus is provided with the position sensor 801 for detecting the rotational position of the AC rotary machine 1 and the rotating speed calculator 802 for calculating the rotating speed of the AC rotary machine 1 based on the rotational position thereof obtained from the position sensor 801 as mentioned above. Referring to FIG. 18, the control apparatus of this embodiment further includes a voltage command calculator 5f, a coordinate converter 6f, a position command amplifier 803 and an adder 804.

The actuator speed command calculator 9f calculates the actuator speed command defining the speed at which the actuator 2 should run based on the rotational position obtained from the rotating speed calculator 802, the d- and q-axis currents and the d- and q-axis voltage commands expressed in the dual-axis (dq-axis) rotating coordinate system and the magnetic flux amplitude command output from a magnetic flux command calculator 15e, and outputs the actuator speed command thus generated to the actuator controller 14 as mentioned above.

As shown in FIG. 18, the actuator speed command calculator 9f incorporates a magnetic flux estimator 10e, a subtracter 11, a speed command calculator 12c and a position command calculator 501 for generating a position command indicating an angular position that the actuator 2 should take based on the magnetic flux amplitude command. Like the position command calculator 501 of the earlier-discussed fifth embodiment shown in FIG. 13, the position command calculator 501 of the seventh embodiment generates the position command indicating the angular position that the actuator 2 should take and outputs the position command to the position command amplifier 803 which multiplies the position command output from the position command calculator 501 by a specific multiplying factor, or gain.

The multiplying factor used in this multiplication is determined in relation to the ratio of the axial length of the first stator element 101 to the axial length of the second stator element 102. Specifically, if the ratio of the axial length of the first stator element 101 to that of the second stator element 102 is 1:n, the position command amplifier 803 multiplies the position command output from the position command calculator 501 by 1/(1+n). For example, if the ratio of the axial length of the first stator element 101 to that of the second stator element 102 is 1:1, the position command amplifier 803 multiplies the position command representative of the angular position that the actuator 2 should take by ½, and if the ratio of the axial length of the first stator element 101 to that of the second stator element 102 is 1:2, the position command amplifier 803 multiplies the position command representative of the angular position that the actuator 2 should take by ⅓.

The adder 804 adds the rotational position of the AC rotary machine 1 obtained from the position sensor 801 to an output of the position command amplifier 803. A coordinate converter 8f provided within the voltage command calculator 5f performs coordinate conversion by using an output of the adder 804 instead of the estimated magnetic flux phase. Likewise, the coordinate converter 6f performs coordinate conversion by using the output of the adder 804 instead of the estimated magnetic flux phase.

Like the control apparatuses of the foregoing embodiments, the control apparatus of the seventh embodiment configured as discussed above confers such an advantage that it is not necessary to detect the phase difference Δθ between the first stator element 101 and the second stator element 102 for calculating the amplitude of the magnetic flux produced by the rotor 103 and, therefore, the amplitude of the magnetic flux produced by the rotor 103 of the AC rotary machine 1 can be so controlled as to match a desired value without using a position sensor for detecting the phase difference Δθ. Additionally, since the control apparatus of this embodiment relieves the magnetic flux estimator 10e of the need to calculate the estimated magnetic flux phase θ, there is created an advantage that mathematical operation performed by the control apparatus is simplified by a corresponding amount.

Eighth Embodiment

While the actuator speed command calculator 9f of the aforementioned seventh embodiment calculates and outputs the actuator speed command specifying the speed at which the actuator 2 should run based on the rotating speed of the AC rotary machine 1 obtained from the rotating speed calculator 802, the d- and q-axis currents and the d- and q-axis voltage commands expressed in the dual-axis (dq-axis) rotating coordinate system and the magnetic flux amplitude command output from the magnetic flux command calculator 15e, a control apparatus for controlling an AC rotary machine 1 according to an eighth embodiment of the invention calculates the actuator speed command specifying the speed at which the actuator 2 should run in a different way. Specifically, the control apparatus of the eighth embodiment includes an actuator speed command calculator 9g, an actuator controller 14, a magnetic flux command calculator 15e and a rotating speed calculator 802, the control apparatus being configured such that the d-axis current command is set to zero and the actuator speed command calculator 9g calculates an actuator speed command specifying the speed at which the actuator 2 should run based on the rotating speed of the AC rotary machine 1 obtained from the rotating speed calculator 802, the q-axis current and the q-axis voltage command expressed in the dual-axis (dq-axis) rotating coordinate system and the magnetic flux amplitude command output from the magnetic flux command calculator 15e and outputs the actuator speed command thus generated to the actuator controller 14.

Figure 19:
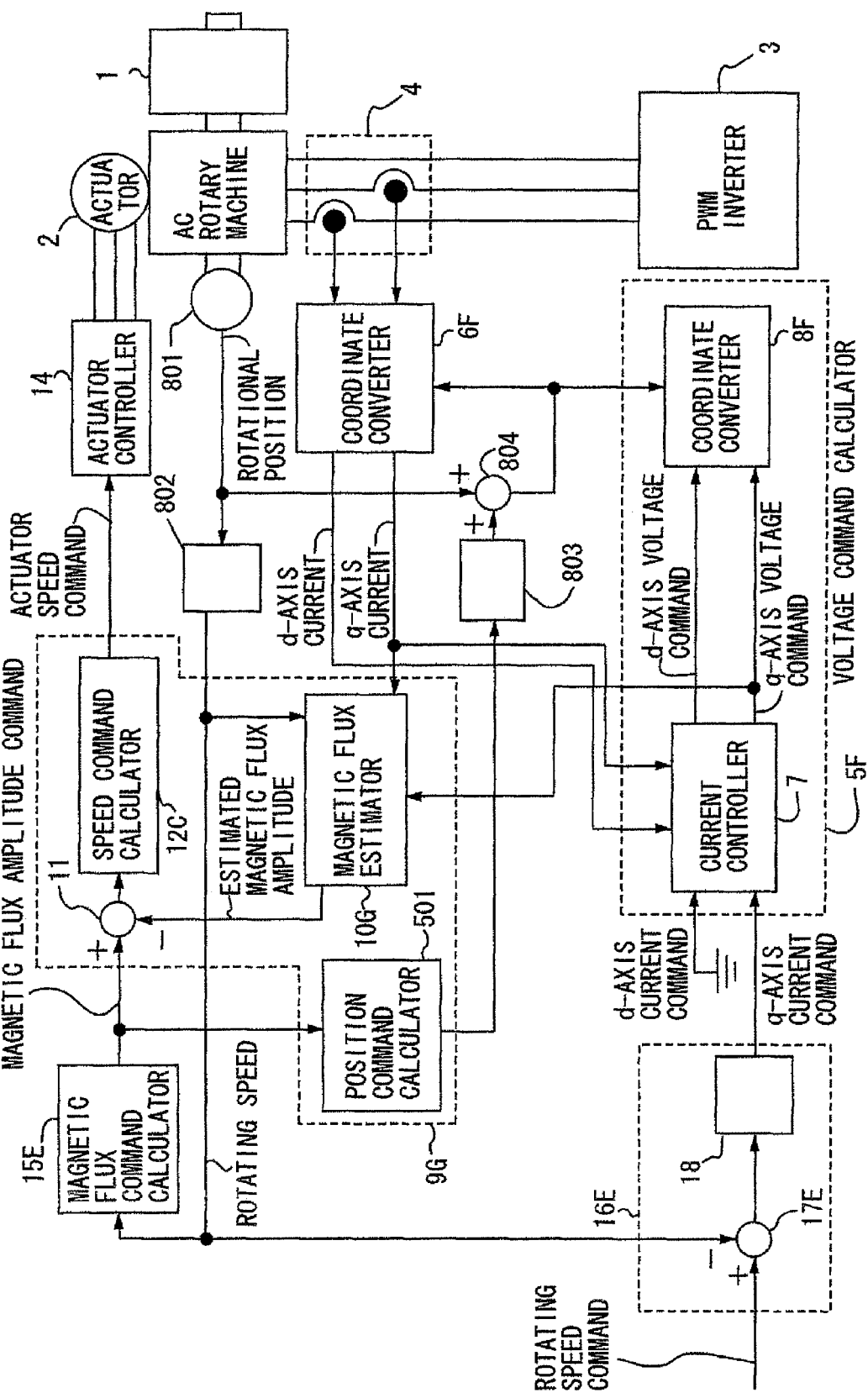
FIG. 19 is a block diagram of a control apparatus for controlling an AC rotary machine according to an eighth embodiment of the invention.

The control apparatus of the eighth embodiment shown in FIG. 19 is described in detail below. Referring to FIG. 19, the actuator speed command calculator 9g calculates the actuator speed command specifying the speed at which the actuator 2 should run based on the rotating speed of the AC rotary machine 1 obtained from the rotating speed calculator 802, the q-axis current and the q-axis voltage command expressed in the dual-axis (dq-axis) rotating coordinate system and the magnetic flux amplitude command output from the magnetic flux command calculator 15e and outputs the actuator speed command thus generated to the actuator controller 14. To be more specific, a magnetic flux estimator 10g provided within the actuator speed command calculator 9g calculates estimated magnetic flux amplitude from the rotating speed of the AC rotary machine 1 obtained from the rotating speed calculator 802, the q-axis current and the q-axis voltage command expressed in the dual-axis (dq-axis) rotating coordinate system and the magnetic flux amplitude command output from the magnetic flux command calculator 15e.

Compared to the magnetic flux estimators 10, 10e of the foregoing embodiments, the magnetic flux estimator 10g of the eighth embodiment is configured to calculate the estimated magnetic flux amplitude in a simple fashion taking advantage of the fact that the d-axis current has zero value in this embodiment.

When and the control apparatus is operating in steady-state operation with the d-axis current set to zero, there is a relationship expressed by the following equation among the q-axis voltage, q-axis current and magnetic flux amplitude:

($q$-axis voltage)=(armature resistance $R$)×($q$-axis current)+(angular velocity of rotation)×(magnetic flux amplitude)

The magnetic flux estimator 10g calculates the estimated magnetic flux amplitude by the following equation using the above relationship:

(Estimated magnetic flux amplitude)=((q-axis voltage command)−R×(q-axis current))/(angular velocity of rotation)

Figure 20:
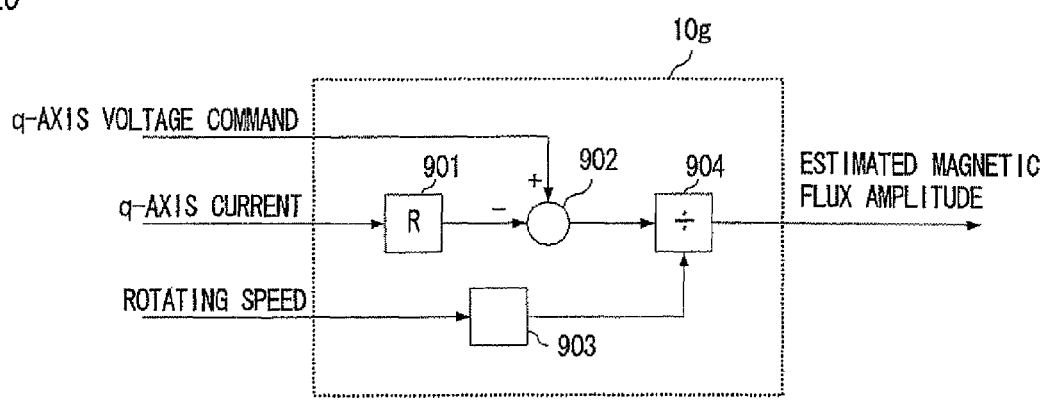
FIG. 20 is a diagram showing an internal configuration of a magnetic flux estimator of the control apparatus of FIG. 19.

FIG. 20 is a diagram specifically showing an internal configuration of the magnetic flux estimator 10g of the control apparatus of the eighth embodiment, the magnetic flux estimator 10g including a gain calculator 901, a subtracter 902, a limiter 903 and a divider 904. The gain calculator 901 multiplies the q-axis current by the armature resistance R of the AC rotary machine 1. The subtracter 902 subtracts the amount of voltage drop caused by the q-axis current flowing through the armature resistance R obtained by the gain calculator 901 from the value of the q-axis voltage command. To prevent the divider 904 from dividing any input quantity by zero, the limiter 903 outputs a specified value when the absolute value of the machine rotating speed is in the proximity of zero whereas the limiter 903 otherwise outputs the value of the machine rotating speed. The divider 904 divides an output of the subtracter 902 by an output of the limiter 903 and then outputs the result of this division as the estimated magnetic flux amplitude.

As depicted in FIG. 19, the actuator speed command calculator 9g includes, in addition to the aforementioned magnetic flux estimator 10g, a subtracter 11, a speed command calculator 12c and a position command calculator 501. The actuator speed command calculator 9g is provided with the magnetic flux estimator 10g for calculating the estimated magnetic flux amplitude based on the detected currents output from the current sensor 4 and the voltage commands and the speed command calculator 12c for calculating the actuator speed command based on a deviation of the estimated magnetic flux amplitude from the value of the magnetic flux amplitude command output from the subtracter 11 in the above-described configuration of the present embodiment. This arrangement of the embodiment produces such an advantage that it is not necessary to detect the phase difference Δθ between the first stator element 101 and the second stator element 102 for calculating the amplitude of the magnetic flux produced by the rotor 103, so that the amplitude of the magnetic flux produced by the rotor 103 of the AC rotary machine 1 can be so controlled as to match a desired value without using a position sensor for detecting the phase difference Δθ. The aforementioned configuration of the present embodiment confers an additional advantage that mathematical operation performed by the magnetic flux estimator 10g is simplified.

Ninth Embodiment

While the control apparatuses of the foregoing embodiments each control the AC rotary machine 1 by using the rotating speed command, these control apparatuses may be so modified as to control the AC rotary machine 1 by using a torque command. A control apparatus for controlling an AC rotary machine 1 according to a ninth embodiment employing this kind of modified arrangement is described below with reference to FIG. 21.

Generally, there is a relationship expressed by the following equation among the torque, magnetic flux and q-axis current of the AC rotary machine 1:

(Torque generated by AC rotary machine 1)=(number of pole pairs of the AC rotary machine 1)×(magnetic flux)×(q-axis current)

One approach to controlling the AC rotary machine 1 by using a torque command is to calculate the amount of the q-axis current command according to the following equation which is derived from the aforementioned relationship:

(q-axis current command) (torque command for the AC rotary machine 1)/|(number of pole pairs of the AC rotary machine 1)×(magnetic flux amplitude command)|

Figure 21:
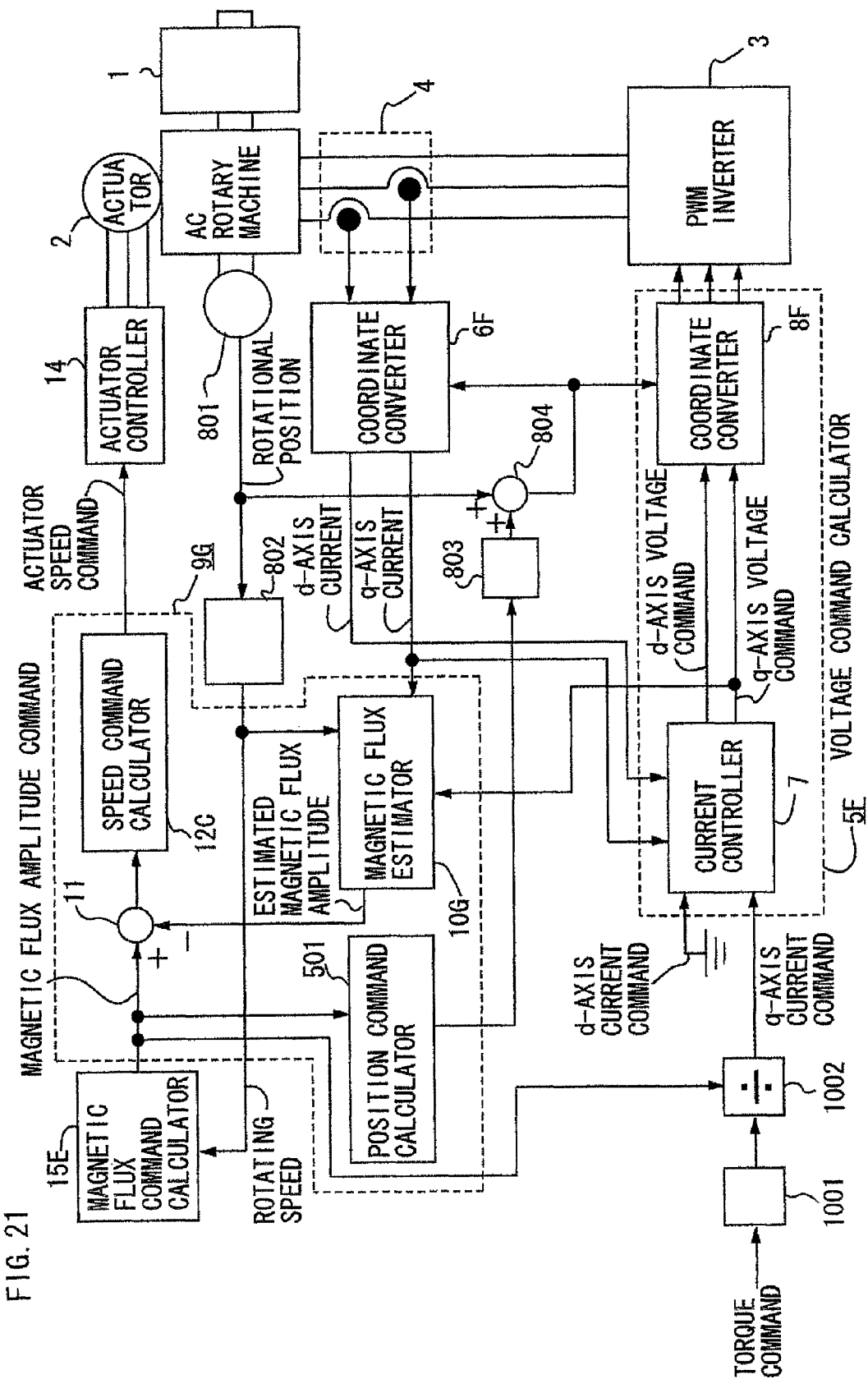
FIG. 21 is a block diagram of a control apparatus for controlling an AC rotary machine according to a ninth embodiment of the invention.

Referring to FIG. 21, the control apparatus of this embodiment includes a gain calculator 1001 which multiplies the torque command by the reciprocal of the number of pole pairs of the AC rotary machine 1 and a divider 1002 which divides an output of the gain calculator 1001 by the magnetic flux amplitude command and outputs the result of this division as the q-axis current command.

The aforementioned configuration of the ninth embodiment makes it possible to control the AC rotary machine 1 by using the torque command while producing the same advantageous effect as the foregoing embodiments.

Tenth Embodiment

While the actuator speed command calculator 9 (9a, 9b, 9c, 9d, 9e, 9f, 9g) of the foregoing embodiments generates and outputs the actuator speed command specifying a speed at which the actuator 2 should run based on the detected currents output from the current sensor 4, the voltage commands and the magnetic flux amplitude command to the actuator controller 14, this arrangement may be so modified as to use the current commands instead of the detected currents in determining the actuator speed command.

Figure 22:
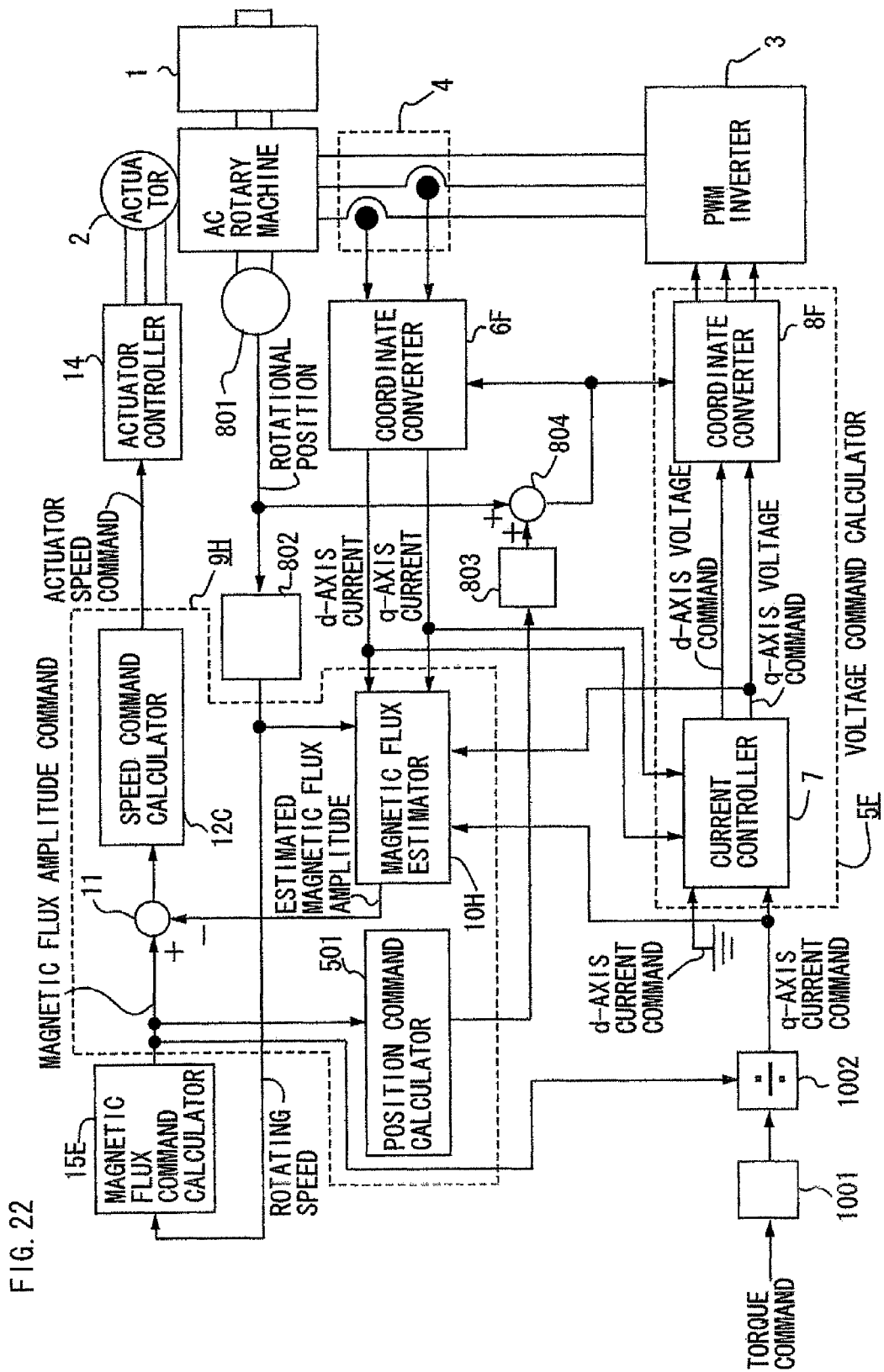
FIG. 22 is a block diagram of a control apparatus for controlling an AC rotary machine according to a tenth embodiment of the invention.

A control apparatus for controlling an AC rotary machine 1 according to a tenth embodiment employing the aforementioned modified arrangement is described below with reference to FIG. 22. As shown in FIG. 22, the control apparatus of the tenth embodiment includes an actuator speed command calculator 9h and a voltage command calculator 5f.

While the actuator speed command calculator 9g of the ninth embodiment uses the q-axis current, the q-axis voltage command and the rotating speed as input parameters, an actuator speed command calculator 9h of the control apparatus of the present embodiment shown in FIG. 22 uses the q-axis current command instead of the q-axis current as an input parameter.

Since the control apparatus controls the AC rotary machine 1 using the voltage commands generated by the voltage command calculator 5f such that the q-axis current matches the F-axis current command, the control apparatus of the tenth embodiment can produce the same advantageous effect as the control apparatus of the ninth embodiment provided with the actuator speed command calculator 9g by using the q-axis current command instead of the q-axis current. In addition, although the q-axis current detected by the current sensor 4 may potentially contain noise, the q-axis current command does not contain such noise. This serves to reduce noise contained in the estimated magnetic flux amplitude output from the magnetic flux estimator 10h.

Eleventh Embodiment

While the AC rotary machine 1 includes the first and second stator elements 101, 102 which are separated along the axial direction of the AC rotary machine 1 in the foregoing embodiments, the present invention is applicable to an AC rotary machine having two concentrically arranged stator elements which are separated from each other in a radial direction.

A control apparatus for controlling an AC rotary machine 1*i* according to an eleventh embodiment of the invention is now described with reference to FIGS. 23 and 24.

Figure 23:
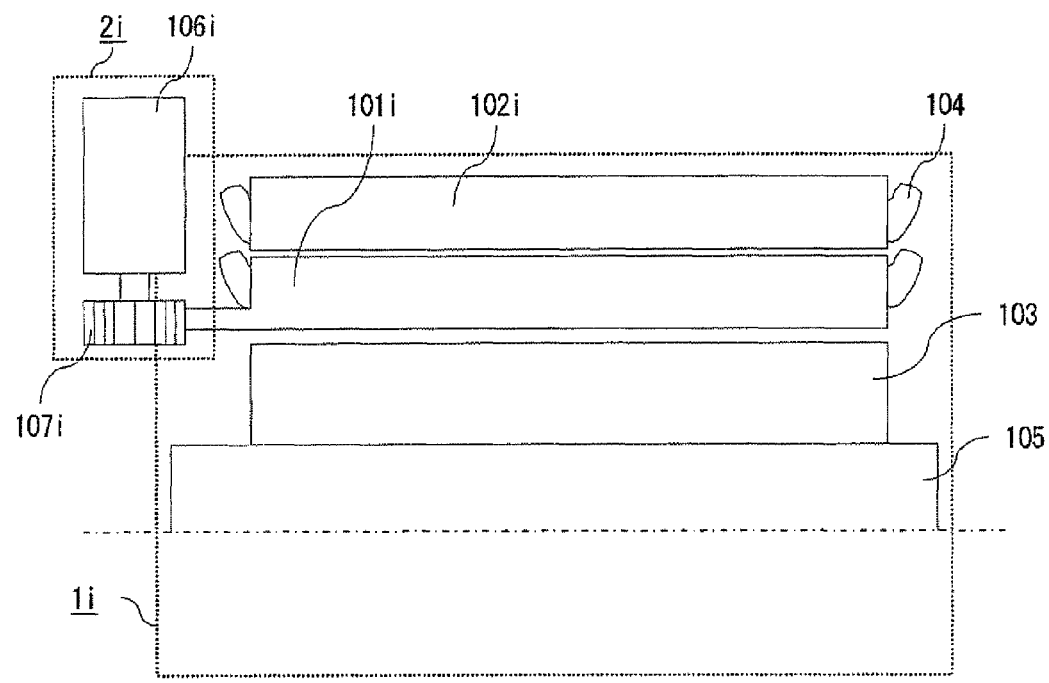
FIG. 23 is a diagram showing the structure of an AC rotary machine and an actuator constituting part of a control apparatus for controlling the AC rotary machine according to an eleventh embodiment of the invention.

FIG. 23 is a diagram showing the structure of the AC rotary machine 1*i* and an actuator 2*i* which constitutes part of the control apparatus. As shown in FIG. 23, the AC rotary machine 1*i* including a first stator element 101*i* and a second stator element 102*i* which are separated from each other in the radial direction of the AC rotary machine 1*i*.

The first and second stator elements 101*i*, 102*i* are provided with coils which are wound such that coil ends 104 protrude from axial ends of the stator elements 101*i*, 102*i* as illustrated. The actuator 2*i* includes an auxiliary rotary machine 106*i* and a gear 107*i* which together serve to rotate the first stator element 101*i* in a circumferential direction thereof. While the gear 107*i* has an axis which intersects a common axis of the first stator element 101*i* and the second stator element 102*i* as depicted in FIG. 23 in the present embodiment, the gear 107*i* may be configured to have an axis parallel to or skewed with respect to the common axis of the first stator element 101*i* and the second stator element 102*i*. The AC rotary machine 1*i* is provided with a stopper (not shown) for restricting movement (or rotation) of the first stator element 101*i* in the circumferential direction thereof within a range of 0 degrees to 180 degrees in terms of electrical angle of the AC rotary machine 1*i*.

Figure 24:
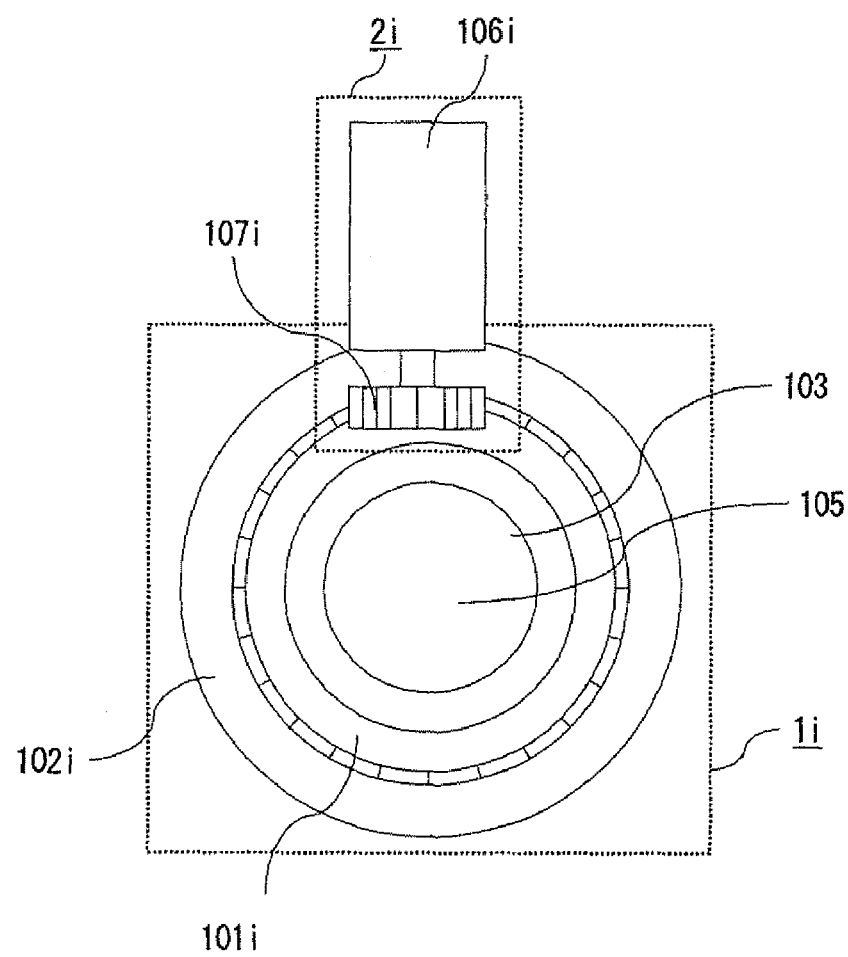
FIG. 24 is a side view of the AC rotary machine of FIG. 23 associated with the actuator.

FIG. 24 is a side view of the AC rotary machine 1*i* associated with the actuator 2*i*. The actuator 2*i* provided in the control apparatus of the present embodiment serves to offset the first stator element 101*i* in the circumferential direction thereof to create a phase difference $\Delta\theta$ between the first stator element 101*i* and the second stator element 102*i*. The coils (not shown) of the two stator elements 101*i*, 102*i* may be connected either in series or parallel to each other.

Needless to say, the control apparatus of the eleventh embodiment applied to the above-described AC rotary machine 1*i* produces the same advantageous effect as the control apparatuses of the foregoing embodiments applied to the AC rotary machine 1. If two stator elements are arranged in tandem along the axial direction of a rotary machine, coils wound on the two stator elements form four coil ends as shown in FIG. 2. In contrast, there are formed only two coil ends at axial ends in a rotary machine whose stator elements are concentrically arranged as shown in FIG. 24. Thus, the above-described configuration of the eleventh embodiment is advantageous in that this configuration serves to reduce the axial (longitudinal) length of the rotary machine.

Also, a stator of the AC rotary machine 1 is divided into two stator elements, one of which (i.e., the first stator element 101 which is movable) being driven by the actuator 2 to adjust a voltage induced in that stator element, in the AC rotary machine 1 of the foregoing embodiments. As one variation of the present invention, even when the stator is divided into three or more stator elements, at least one of which being made movable by an actuator, it is possible to similarly adjust the voltage induced in the stator and thereby produce the same advantageous effect as discussed above.

As another variation of the present invention, the rotor 103 of the AC rotary machine 1 may be divided into at least two rotor elements, at least one of which being made movable by an actuator so that a phase difference between, or a difference in angular positions of, the movable and stationary rotor elements can be varied. Theoretically, this variation of the invention permits adjustment of the induced voltage, thus producing the same advantageous effect as discussed above. Needless to say, both the stator and the rotor may be divided into plural elements.

In addition, while a permanent magnet is used in the rotor 103 of the AC rotary machine 1 in each of the foregoing embodiments, it goes without saying that the invention is applicable to a rotary machine whose rotor is not provided with a permanent magnet.

In summary, a control apparatus of the present invention is for controlling an AC rotary machine which includes a stator and a rotor, the stator having a coil wound thereon, in which at least one of the stator and the rotor is divided into at least two separate elements which are so configured that a phase difference representative of a relative position difference between one separate element and another can be varied in a circumferential direction. The control apparatus includes an actuator for adjusting a voltage induced in the coil of the stator due to rotation of the rotor by driving at least one of the separate elements, a magnetic flux command calculator for calculating a desired magnetic flux amplitude command based on rotating speed of the AC rotary machine, a magnetic flux estimator for calculating estimated magnetic flux amplitude of the AC rotary machine, a speed command calculator for calculating an actuator speed command to be given to the actuator so that the estimated magnetic flux amplitude follows the magnetic flux amplitude command, and an actuator controller for controlling the actuator according to the actuator speed command.

In the control apparatus thus configured, the actuator controller controls the actuator according to the actuator speed command, and not a position command, so that the control apparatus does not require generally complex and expensive means for detecting the phase difference. Thus, it is possible to control the AC rotary machine by using the inexpensive and less complex means, or the actuator, according to the present invention.

In one feature of the invention, the aforementioned speed command calculator preferably generates the actuator speed command by calculating at least a value proportional to an input deviation of the estimated magnetic flux amplitude from the magnetic flux amplitude command and outputs the value thus calculated as the actuator speed command. This arrangement provides the control apparatus with such a control capability that the estimated magnetic flux amplitude follows the magnetic flux amplitude command in a reliable fashion.

In another feature of the invention, the speed command calculator is preferably configured to adjust control gain thereof according to the magnetic flux amplitude command so that the actuator maintains a constant level of control response regardless of the value of magnetic flux amplitude. This arrangement provides the control apparatus with a more smooth control capability.

Alternatively, the speed command calculator is preferably configured to adjust control gain thereof according to the estimated magnetic flux amplitude so that the actuator maintains a constant level of control response regardless of the value of magnetic flux amplitude. This arrangement also provides the control apparatus with a more smooth control capability.

In another feature of the invention, the control apparatus for controlling the AC rotary machine further includes a position command calculator for calculating a value that the phase difference should take based on the magnetic flux amplitude command and outputting the value thus calculated as a position command, and a position estimator for calculating a value that the phase difference should take based on the estimated magnetic flux amplitude and outputting the value thus calculated as an estimated angular position. In the control apparatus thus configured, the speed command calculator generates the actuator speed command by calculating at least a value proportional to an input deviation of the estimated angular position from the position command and outputs the value thus calculated as the actuator speed command. This arrangement makes it possible to maintain a constant level of control response regardless of the value of magnetic flux amplitude, thus providing the control apparatus with a more smooth control capability.

In another feature of the invention, the control apparatus for controlling the AC rotary machine further includes a voltage applicator for applying a voltage to the AC rotary machine, a current sensor for detecting the amount of current flowing into the AC rotary machine, and a voltage command calculator for calculating and outputting a voltage command specifying the voltage to be applied by the voltage applicator based on a desired value of a current command and the amount of current obtained from the current sensor. In the control apparatus thus configured, the magnetic flux estimator estimates magnetic flux amplitude and the rotating speed based on the amount of the detected current and the voltage command. This arrangement permits reliable calculation of the rotating speed command.

In another feature of the invention, the control apparatus for controlling the AC rotary machine further includes a voltage applicator for applying a voltage to the AC rotary machine, a current sensor for detecting the amount of current flowing into the AC rotary machine, a voltage command calculator for calculating and outputting a voltage command specifying the voltage to be applied by the voltage applicator based on a desired value of a current command and the amount of current obtained from the current sensor, and a rotating speed sensor for detecting the rotating speed of the AC rotary machine. In the control apparatus thus configured, the magnetic flux estimator estimates magnetic flux amplitude based on the amount of the detected current and the voltage command, and the magnetic flux command calculator calculates the desired magnetic flux amplitude command based on the rotating speed obtained from the rotating speed sensor. The control apparatus thus configured makes it possible to calculate the rotating speed command in a reliable fashion with a simple configuration.

In still another feature of the invention, the control apparatus for controlling the AC rotary machine further includes a voltage applicator for applying a voltage to the AC rotary machine, a current sensor for detecting the amount of current flowing into the AC rotary machine, a voltage command calculator for calculating and outputting a voltage command specifying the voltage to be applied by the voltage applicator based on a desired value of a current command and the amount of current obtained from the current sensor, a rotational position sensor for detecting the rotational position of the AC rotary machine, and a rotating speed calculator for calculating the rotating speed of the AC rotary machine based on the rotational position obtained from the rotating speed calculator. In the control apparatus thus configured, the magnetic flux estimator estimates magnetic flux amplitude based on the amount of the detected current and the voltage command, and the magnetic flux command calculator calculates the desired magnetic flux amplitude command based on the rotating speed obtained from the rotating speed sensor. The control apparatus thus configured also makes it possible to calculate the rotating speed command in a reliable fashion with a simple configuration.

In yet another feature of the invention, the control apparatus controls the voltage command, the current command and the current detected by the current sensor in a dual-axis rotating coordinate system having d- and q-axes, the control apparatus further including a current command calculator for outputting a d-axis current command for suppressing the voltage induced in the AC rotary machine to the voltage command calculator when the value of the actuator speed command exceeds a specified upper limit with the deviation of the estimated magnetic flux amplitude from the magnetic flux amplitude command and the actuator speed command input into the control apparatus. The control apparatus thus configured makes it possible to maintain the voltage induced in the AC rotary machine within a specified range even when the actuator speed can not be controlled to follow the actuator speed command.

In a further feature of the invention, the rotor includes a permanent magnet. The present invention is applicable to a permanent magnet AC rotary machine in which an excessively high voltage tends to be induced in a high-speed range. The invention is particularly effective when applied to the permanent magnet AC rotary machine.

Various modifications and alterations of the present invention will be apparent to those skilled in the art without departing from the scope and spirit of the invention, and it should be understood that this is not limited to the illustrative embodiments set forth herein.

The invention claimed is:

1. A control apparatus for controlling an alternating current rotary machine including a stator and a rotor, the stator having a coil wound thereon, in which at least one of said stator and said rotor is divided into at least two separate elements which are so configured that a phase difference representative of a relative position difference between one separate element and another can be varied in a circumferential direction, said control apparatus comprising:

an actuator for adjusting a voltage induced in the coil of said stator, due to rotation of said rotor, by driving at least one of said separate elements;

a magnetic flux command calculator for calculating a desired magnetic flux amplitude command based on rotating speed of said alternating current rotary machine;

a magnetic flux estimator for calculating estimated magnetic flux amplitude of said alternating current rotary machine;

a speed command calculator for calculating an actuator speed command to be given to said actuator so that the estimated magnetic flux amplitude follows the magnetic flux amplitude command; and an actuator controller for controlling said actuator according to the actuator speed command.

2. The control apparatus for controlling the alternating current rotary machine according to claim 1, wherein said speed command calculator generates the actuator speed command by calculating at least a value proportional to an input deviation of the estimated magnetic flux amplitude from the magnetic flux amplitude command and outputs the value as the actuator speed command.

3. The control apparatus for controlling the alternating current rotary machine according to claim 2, wherein said speed command calculator is configured to adjust control gain of said speed command calculator according to the magnetic flux amplitude command so that said actuator maintains a constant level of control response regardless of the magnetic flux amplitude.

4. The control apparatus for controlling the alternating current rotary machine according to claim 2, wherein said speed command calculator is configured to adjust control gain of said speed command calculator according to the estimated magnetic flux amplitude so that said actuator maintains a constant level of control response regardless of the magnetic flux amplitude.

5. The control apparatus for controlling the alternating current rotary machine according to claim 1, said control apparatus further comprising:
  a position command calculator for calculating a first value that the phase difference should take based on the magnetic flux amplitude command and outputting the first value as a position command, and
  a position estimator for calculating a second value that said phase difference should take based on the estimated magnetic flux amplitude and outputting the second value as an estimated angular position; wherein said speed command calculator generates the actuator speed command by calculating at least a third value proportional to an input deviation of the estimated angular position from the position command and outputs the third value as the actuator speed command.

6. The control apparatus for controlling the alternating current rotary machine according to claim 1, said control apparatus further comprising:
  a voltage applicator for applying a voltage to said alternating current rotary machine;
  a current sensor for detecting magnitude of current flowing into said alternating current rotary machine; and
  a voltage command calculator for calculating and outputting a voltage command specifying the voltage to be applied by said voltage applicator based on a desired value of a current command and the current detected by said current sensor, wherein said magnetic flux estimator estimates magnetic flux amplitude and rotating speed based on the current detected and the voltage command.

7. The control apparatus for controlling the alternating current rotary machine according to claim 6, wherein said control apparatus controls the voltage command, the current command, and the current detected by said current sensor in a dual-axis rotating coordinate system having d- and q-axes, said control apparatus further comprising:
  a current command calculator for outputting a d-axis current command, for suppressing the voltage induced in said alternating current rotary machine, to said voltage command calculator, when the actuator speed command exceeds a specified upper limit, with deviation of estimated magnetic flux amplitude from the magnetic flux amplitude command and the actuator speed command input into said control apparatus.

8. The control apparatus for controlling the alternating current rotary machine according to claim 1, said control apparatus further comprising:
  a voltage applicator for applying a voltage to said alternating current rotary machine;
  a current sensor for detecting magnitude of current flowing into said alternating current rotary machine;
  a voltage command calculator for calculating and outputting a voltage command specifying the voltage to be applied by said voltage applicator based on a desired value of a current command and the current detected by said current sensor; and
  a rotating speed sensor for detecting rotating speed of said alternating current rotary machine, wherein
    said magnetic flux estimator estimates magnetic flux amplitude based on the current detected and the voltage command, and
    said magnetic flux command calculator calculates the magnetic flux amplitude command based on the rotating speed detected by said rotating speed sensor.

9. The control apparatus for controlling the alternating current rotary machine according to claim 8, wherein said control apparatus controls the voltage command, the current command, and the current detected by said current sensor in a dual-axis rotating coordinate system having d- and q-axes, said control apparatus further comprising:
  a current command calculator for outputting a d-axis current command, for suppressing the voltage induced in said alternating current rotary machine, to said voltage command calculator, when the value of the actuator speed command exceeds a specified upper limit, with deviation of the estimated magnetic flux amplitude from the magnetic flux amplitude command and the actuator speed command input into said control apparatus.

10. The control apparatus for controlling the alternating current rotary machine according to claim 1, said control apparatus further comprising:
  a voltage applicator for applying a voltage to said alternating current rotary machine;
  a current sensor for detecting magnitude of current flowing into said alternating current rotary machine;
  a voltage command calculator for calculating and outputting a voltage command specifying the voltage to be applied by said voltage applicator based on a desired value of a current command and the current detected by said current sensor;
  a rotational position sensor for detecting the rotational position of said alternating current rotary machine; and
  a rotating speed calculator for calculating rotating speed of said alternating current rotary machine based on the rotational position detected by said rotational position sensor, wherein
    said magnetic flux estimator estimates magnetic flux amplitude based on the current detected and the voltage command, and
    said magnetic flux command calculator calculates the magnetic flux amplitude command based on the rotating speed detected by said rotating speed calculator.

11. The control apparatus for controlling the alternating current rotary machine according to claim 10, wherein said control apparatus controls the voltage command, the current command, and the current detected by said current sensor in a dual-axis rotating coordinate system having d- and q-axes, said control apparatus further comprising:
  a current command calculator for outputting a d-axis current command, for suppressing the voltage induced in said alternating current rotary machine, to said voltage command calculator, when the actuator speed command exceeds a specified upper limit, with deviation of the estimated magnetic flux amplitude from the magnetic flux amplitude command and the actuator speed command input into said control apparatus.

12. The control apparatus for controlling the alternating current rotary machine according to claim 1, wherein said rotor includes a permanent magnet.

* * * * *